United States Patent
Li et al.

(10) Patent No.: US 12,238,043 B2
(45) Date of Patent: Feb. 25, 2025

(54) TRANSMISSION METHODS AND DEVICES, AND TERMINAL, BASE STATION, COMMUNICATION SYSTEM, AND STORAGE MEDIUM

(71) Applicant: ZTE CORPORATION, Shenzhen (CN)

(72) Inventors: Weimin Li, Shenzhen (CN); Junfeng Zhang, Shenzhen (CN); Li Tian, Shenzhen (CN); Yuzhou Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 541 days.

(21) Appl. No.: 17/599,426

(22) PCT Filed: Mar. 30, 2020

(86) PCT No.: PCT/CN2020/082030
§ 371 (c)(1),
(2) Date: Nov. 24, 2021

(87) PCT Pub. No.: WO2020/200157
PCT Pub. Date: Oct. 8, 2020

(65) Prior Publication Data
US 2022/0200772 A1     Jun. 23, 2022

(30) Foreign Application Priority Data
Mar. 29, 2019   (CN) .......................... 201910251605.0

(51) Int. Cl.
*H04L 5/00*     (2006.01)

(52) U.S. Cl.
CPC .......... *H04L 5/0094* (2013.01); *H04L 5/0044* (2013.01); *H04L 5/0048* (2013.01)

(58) Field of Classification Search
CPC .... H04L 5/0094; H04L 5/0044; H04L 5/0048
See application file for complete search history.

(56) References Cited

U.S. PATENT DOCUMENTS

| | | | | |
|---|---|---|---|---|
| 2019/0149383 A1* | 5/2019 | Ko | ........................ | H04W 72/04 |
| | | | | 370/329 |
| 2020/0154376 A1* | 5/2020 | Ko | ........................ | H04W 72/30 |
| | (Continued) | | | |

FOREIGN PATENT DOCUMENTS

| | | |
|---|---|---|
| CN | 104981022 A | 10/2015 |
| CN | 109328484 A | 2/2019 |
| | (Continued) | |

OTHER PUBLICATIONS

Zte et al., "Considerations on the channel structure of msgA," 3GPP TSG RAN WG1 Meeting #96, R1-1901626, Mar. 1, 2019, 5 pages.

(Continued)

*Primary Examiner* — Kent Krueger
(74) *Attorney, Agent, or Firm* — Morgan, Lewis & Bockius LLP

(57) ABSTRACT

Provided are transmission methods and devices, a terminal, a base station, a communication system and a storage medium. The method includes: acquiring a first index, acquiring first information, and in response to determining that the first index satisfies a first preset rule according to the first information, determining that content to be transmitted includes a first message.

12 Claims, 14 Drawing Sheets

(56) References Cited

U.S. PATENT DOCUMENTS

| | | | | |
|---|---|---|---|---|
| 2020/0163052 A1* | 5/2020 | Ko | ........................ | H04L 5/0051 |
| 2021/0007065 A1* | 1/2021 | Ko | ........................ | H04W 56/00 |
| 2021/0092696 A1* | 3/2021 | Ko | .......................... | H04W 4/40 |
| 2021/0377085 A1* | 12/2021 | Wang | ...................... | H04L 27/20 |

FOREIGN PATENT DOCUMENTS

| | | |
|---|---|---|
| CN | 110536475 A | 12/2019 |
| WO | WO-2017166255 A1 | 10/2017 |

OTHER PUBLICATIONS

Hauwei et al., "Channel structure for 2-step RACH," 3GPP TSG RAN WG1 Meeting #96, R1-1903056, Mar. 1, 2019, 6 pages.

Chinese Search Report for Application No. 2019102516050 dated Mar. 30, 2023, 5 pages including translation.

Chinese Office Action for Application No. 2019102516050 dated Mar. 31, 2023, 14 pages including translation.

Samsung, "Channel Structure for Two-Step RACH", 3GPP TSG RAN WG1 #96, R1-1902241, Feb. 15-Mar. 1, 2019, Athens, Greece, 5 pages.

Supplementary European Search Report in Application No. EP20782247 dated Oct. 19, 2022, 8 pages.

Huawei, et al., "Channel structure for 2-step RACH", *3GPP TSG RAN WG1 Meeting #96 R1-1903056*, Mar. 1, 2019 (Mar. 1, 2019), sections 1, 4, 5 figure 3.

International Search Report for Application No. PCT/CN2020/082030, dated Jun. 29, 2020, 4 pages including English translation.

Zte et al., "Considerations on the channel structure of msgA", *3GPP TSG RAN WG1 Meeting #96 R1-1901626*, Mar. 1, 2019, (Mar. 1, 2019), section 2, and figure 2.

Zte et al., "Summary of 7.2.1.1 Channel Structure for Two-Step RACH", *3GPP TSG RAN WG1 Meeting #96 R1-1903435*, Mar. 1, 2019 (Mar. 1, 2019), entire document.

* cited by examiner

TRANSMISSION METHODS AND DEVICES, AND TERMINAL, BASE STATION, COMMUNICATION SYSTEM, AND STORAGE MEDIUM

CROSS-REFERENCE TO RELATED APPLICATION

This is a national stage application filed under 37 U.S.C. 371 based on International Patent Application No. PCT/CN2020/082030, filed on Mar. 30, 2020, which claims priority to Chinese Patent Application No. 201910251605.0 filed with the China National Intellectual Property Administration (CNIPA) on Mar. 29, 2019, the disclosure of which is incorporated herein by reference in its entirety.

TECHNICAL FIELD

The present application relates to the field of communications and, in particular, to transmission methods and devices, a terminal, a base station, a communication system and a storage medium.

BACKGROUND

In the related art, for example in a long term evolution (LTE) communication system or a new radio access technology (New RAT or NR) communication system, when a terminal or a user equipment (UE) needs to receive downlink data, a cell search process is required to achieve downlink synchronization with the cell. Similarly, when the UE needs to perform an uplink transmission, the UE needs to achieve uplink synchronization with the cell. After the UE completes the uplink and downlink synchronization, the UE enters a radio resource control (RRC) connection state and establishes a radio connection with a base station (BS), so that the UE can send and receive uplink and downlink data. The UE establishes a connection with the cell through a random access process, achieves the uplink synchronization and acquires a unique network identifier. The base station in the LTE system is usually called evolved Node B (eNB), and the base station in the NR system is usually called next generation Node B (gNB) for NR users.

The random access process here includes a contention-based random access and a non-contention-based random access. The contention based random access process includes 4-step random access (4-step RACH) and 2-step random access (2-step RACH). In the 2-step RACH, a preamble of a first step of the 4-step RACH and a payload of a third step of the 4-step RACH may be sent through one message (msgA).

In the 2-step RACH, when a msgA sent by one UE fails to be transmitted or a msgA sent by one UE is not successfully received by the base station, the UE performs a fall back and performs the random access according to 4-step random access process. The UE falls back from the 2-step RACH to the 4-step RACH, which will waste transmission resources. When the large number of UEs fall back, which will waste a large amount of transmission resources and affect the access efficiency of the system and transmission performance of the system.

SUMMARY

To solve at least one above technical problem, embodiments of the present application provide schemes described below.

An embodiment of the present application provides a transmission method. The method includes steps described below.

A first index is acquired.

First information is acquired.

In response to determining that the first index satisfies a first preset rule according to the first information, it is determined that content to be transmitted includes a first message.

An embodiment of the present application provides a transmission method. The method includes steps described below.

A sequence detection is performed and a detected sequence is acquired.

First information is acquired.

In response to determining that the detected sequence satisfies a first preset rule according to the first information, it is determined that transmission content to be received and detected includes a payload.

An embodiment of the present application provides a transmission device. The transmission device includes a first acquisition module, a second acquisition module and a first determination module.

The first acquisition module is configured to acquire a first index.

The second acquisition module is configured to acquire first information.

The first determination module is configured to determine, in response to determining that the first index satisfies a first preset rule according to the first information, that content to be transmitted includes a first message.

An embodiment of the present application provides a transmission device. The transmission device includes a detection module, a third acquisition module and a third determination module.

The detection module is configured to perform a sequence detection and acquire a detected sequence.

The third acquisition module is configured to acquire first information.

The third determination module is configured to determine, in response to determining that the detected sequence satisfies a first preset rule according to the first information, that transmission content to be received and detected includes a payload.

An embodiment of the present application provides a terminal. The terminal includes a processor and a memory.

The memory is configured to store instructions.

The processor is configured to read the instructions to execute the method applied to the terminal in the embodiments of the present application.

An embodiment of the present application provides a base station. The base station includes a processor and a memory.

The memory is configured to store instructions.

The processor is configured to read the instructions to execute the method applied to the base station in the embodiments of the present application.

An embodiment of the present application provides a communication system including the terminal provided by the embodiment of the present application and the base station provided by the embodiment of the present application.

An embodiment of the present application provides a storage medium. The storage medium is configured to store a computer program which, when executed by a processor, implements any one of the methods provided by embodiments of the present application.

In embodiments of the present application, in response to determining that the first index satisfies a first preset rule according to the first information, it is determined that content to be transmitted includes a first message, and a transmission of the first message can be controlled, thereby the collision of transmission resources can be reduced, the waste of transmission resources can be reduced, and the access efficiency of the system and transmission performance of the system can be improved.

DETAILED DESCRIPTION

Embodiments of the present application are described hereinafter in detail in conjunction with the drawings. It is to be noted that if not in collision, embodiments and features therein in the present application may be combined with each other in any manner.

Figure 1:
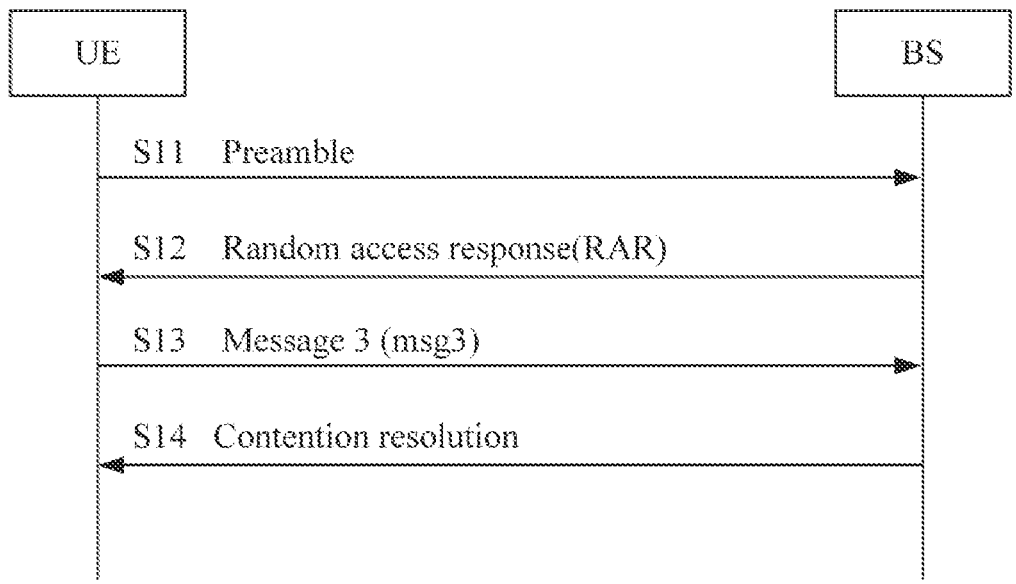
FIG. 1 is a flowchart of 4-step RACH.

As shown in FIG. 1, a contention-based random access may include four steps described below.

In step S11, a UE sends a preamble. Specifically, the UE acquires a preamble sequence and sends the preamble sequence to a base station through a physical random access channel (PRACH). In this way, the base station may be informed that there is one random access request, and at the same time, the base station may estimate a transmission delay between the base station and the UE to calibrate uplink timing. The preamble in this step may also be called a message 1 (msg1).

In step S12, the base station sends a random access response (RAR), where the RAR carries timing adjustment information, uplink scheduling or grant information and a temporary network identifier, etc. After the preamble is sent, the UE will receive the RAR within one RAR time window. If the UE does not receive the RAR replied by the base station within the RAR time window, it is considered that this random access process fails. The RAR in this step may also be called a message 2 (msg2).

In step S13, the UE sends a message (msg3). Specifically, the UE sends a msg3 on a physical uplink sharing channel (PUSCH) according to information received from the RAR. The msg3 includes one piece of important information, i.e., unique identification information of the UE, where the identification information is used on a collision resolution in step S14.

In step S14, the base station sends a contention resolution message, where the contention resolution message can also be called a message 4 (msg4). In this step, the base station will carry the unique identification information of the UE in the msg4 to specify a winning UE in the collision resolution. Other UEs that do not win the collision resolution will re-initiate the random access.

For a non-contention-based random access, the preamble sent by the UE is dedicated to the UE, thereby there is no collision. The UE already has a unique network identifier for accessing a cell and no longer needs a base station to assign a network identifier. Therefore, step S13 and step S14 need not to be performed in a process of the no-contention-based random access.

The above random access process including four step can also be referred to as the 4-step RACH. In order to simplify an access flow and reduce an access delay, the 4-step RACH can be simplified to the 2-step RACH.

Figure 2:
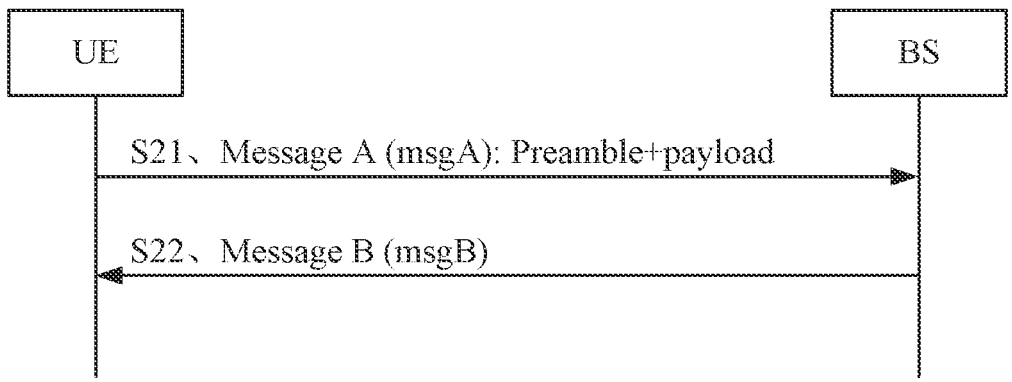
FIG. 2 is a flowchart of 2-step RACH.

As shown in FIG. 2, a process of the 2-step RACH includes two steps described below.

In step S21, the UE sends a message A (msgA). The message A includes two parts: a preamble and a payload. The payload may be sent through a Physical Uplink Shared Channel (PUSCH) for carrying uplink information sent by the UE. The payload may include contents similar to the msg 3 in step S13 of the 4-step RACH, traffic data and the like.

In step S22, the base station sends a message B (msgB), where the message B is used for implementing functions similar to those of steps S12 and S14 in the 4-step RACH, such as the timing adjustment, the collision resolution, etc.

In the 2-step RACH, when a msgA sent by one UE fails to be transmitted or the msgA sent by one UE is not successfully received by the base station, both the preamble and the payload may fail to be transmitted, or the preamble may succeed but the payload may fail to be transmitted. The payload fails to be transmitted that may be caused by the UE using the same resources (e.g. PUSCH resources, DMRS, etc.) as other UEs, i.e., caused by resource collision. In this case, the UE may fall back and perform the random access according to the 4-step RACH process. When both the preamble and the payload fail to be transmitted, the UE can directly re-perform the random access according to the above four steps. When the preamble may succeed but the payload may fail to be transmitted, since the base station detects the preamble but does not receive the payload, the base station can consider that the UE merely sends the preamble, i.e., step S11 of the 4-step RACH, and then the base station sends the RAR to the UE, thereby achieving the fallback, and the subsequent steps are the same as the 4-step RACH.

The UE falls back from the 2-step RACH to the 4-step RACH, the payload transmission performed by the UE through the PUSCH is wasteful or unnecessary, that is, the transmission resources are wasted. Moreover, interference is introduced. When the number of UEs performing the fallback is large, a large amount of transmission resources are wasted, and the access efficiency of the system and transmission performance of the system are affected.

Figure 3:
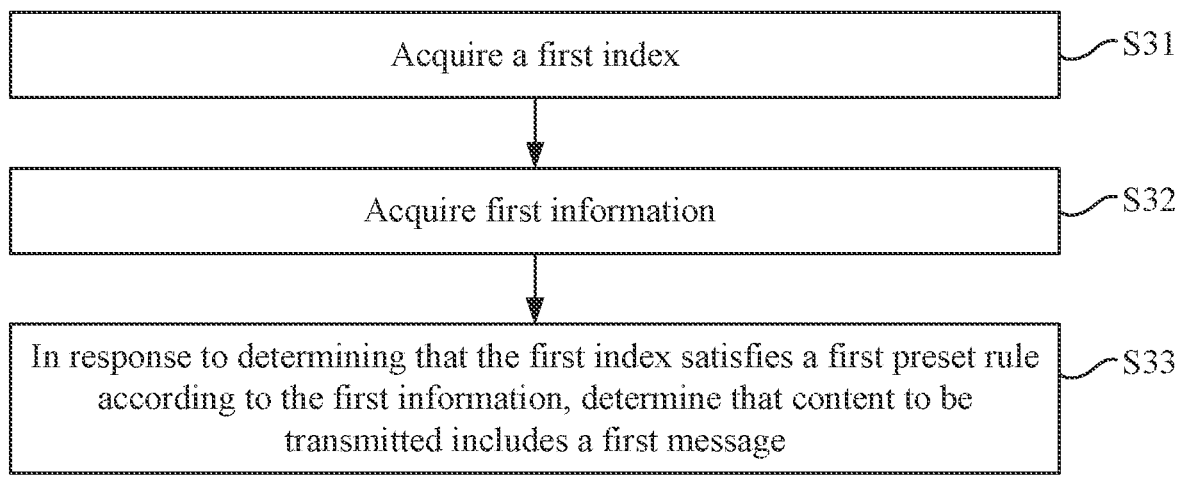
FIG. 3 is a flowchart of a transmission method according to an embodiment of the present application.

FIG. 3 is a flowchart of a transmission method according to an embodiment of the present application. As shown in FIG. 3, the method may include steps described below.

In step S31, a first index is acquired.

In step S32, first information is acquired.

In step S33, in response to determining that the first index satisfies a first preset rule according to the first information, it is determined that content to be transmitted includes a first message.

In one embodiment, the first index may be an index of a sequence, such as an index of a preamble sequence, an index of a pilot sequence, etc. The first index may also be a logical index without specific physical meaning, or may be an index obtained according to specified information, etc.

In one embodiment, the first index may be acquired through random generation or random selection or system configuration or by processing the specified information.

In one embodiment, the first message includes a sequence indicated by the first index and a payload, or the payload. For example, in a random access process, the first index may be the index of the preamble sequence, and the first message may be the message A (msgA) in the aforementioned 2-step RACH, i.e. including the preamble sequence indicated by the first index and the payload. The first index may also be the logical index, or the index obtained according to the specified information, and the first message may include the payload.

Figure 4:
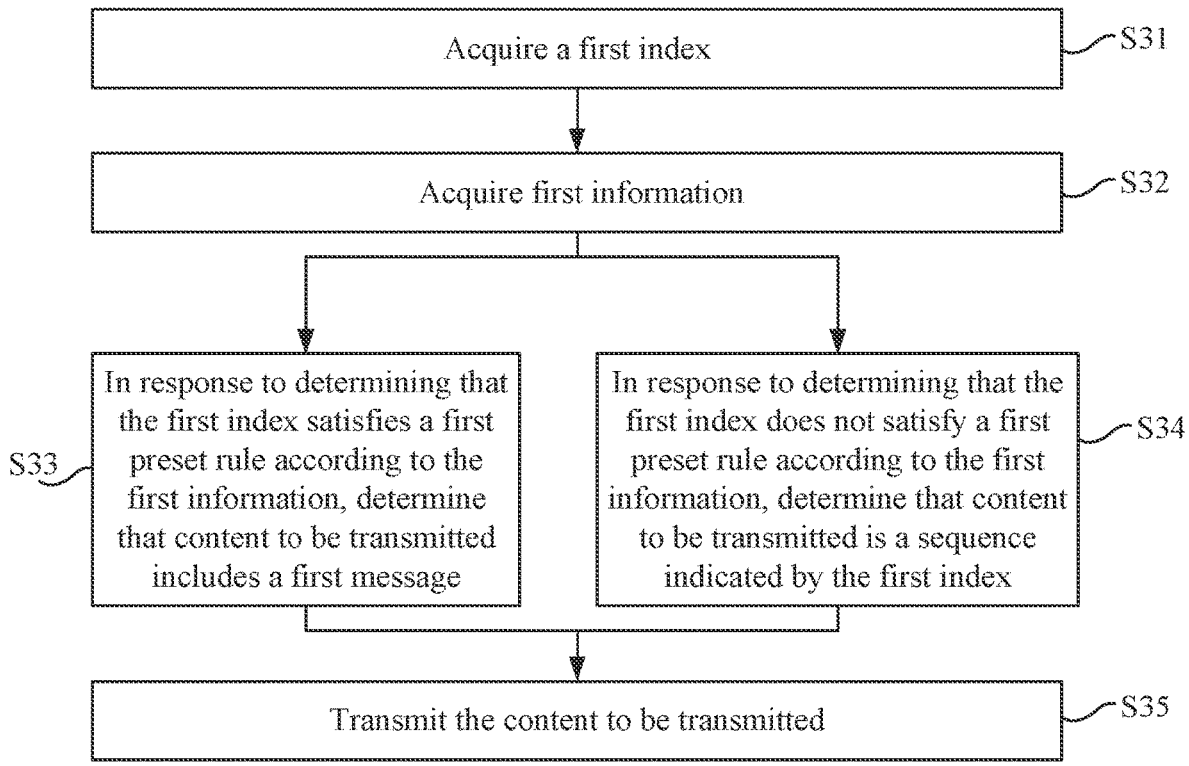
FIG. 4 is a flowchart of a transmission method according to another embodiment of the present application.

In one embodiment, as shown in FIG. 4, the method further includes a step described below.

In step S34, in response to determining that the first index does not satisfy the first preset rule according to the first information, it is determined that the content to be transmitted is a sequence indicated by the first index.

In one embodiment, as shown in FIG. 4, the method further includes a step described below.

In step S35, the content to be transmitted is transmitted.

In this embodiment of the present application, in step S32, step S34, when it is determined that whether the first index satisfies the first preset rule according to the first information, in addition to determining that whether the first preset rule is satisfied with the first index, it can also be determined that whether the first preset rule is satisfied with information associated with the first index.

In this embodiment of the present disclosure, the first information acquired in step S32 may include multiple types of first information, and different first preset rules may be set for different types of first information. Accordingly, step S33 determines that the first index satisfies the first preset rule according to the first information, including different cases, which will be described separately below.

Case one: the first information includes an association relationship between an index and a demodulation reference signal (DMRS).

The index may be the index of the sequence, such as the index of the preamble sequence, the index of the pilot sequence, etc. The index may also be the logical index without specific physical meaning, or may be the index obtained according to the specified information, etc.

The DMRS includes a DMRS time-frequency resource or time-frequency position, a DMRS index, a DMRS port, etc.

The association relationship between the index and the DMRS may include an association relation between all indexes and the DMRS, or an association relationship between a part of indexes and the DMRS. For example, in the random access, the index may be the index of the preamble sequence, so that the association relationship between the index and the DMRS may specifically include an association relation between all preambles and the DMRS, or an association relationship between a part of preambles and the DMRS.

In this case, in step S33, determining that the first index satisfies the first preset rule according to the first information includes determining that the first index belongs to one of specified indexes in indexes associated with one DMRS according to the association relationship between the index and the DMRS; or determining that the first index belongs to a first index set according to the association relationship between the index and the DMRS, where the first index set is acquired according to the association relationship between the index and the DMRS; or determining that the first index has an association relationship with at least one DMRS according to the association relationship between the index and the DMRS; or determining that a DMRS associated with the first index is available according to the association relationship between the index and the DMRS.

In one example, acquiring the first index set according to the association relationship between the index and the DMRS includes acquiring N indexes in M indexes associated with each DMRS in specified DMRSs according to the association relationship between the index and the DMRS, and using the N indexes as indexes in the first index set to obtain the first index set, where M is an integer, N is an integer, and N is less than or equal to M.

In one example, it is determined that the DMRS associated with the first index is available according to the association relationship between the index and the DMRS, and it is determined that transmission resources used for transmitting a sequence indicated by the first index are available.

In one example, determining that the DMRS associated with the first index is available according to the association relationship between the index and the DMRS may be implemented in combination with information on whether the DMRS is available or whether a time-frequency resource in which the DMRS is located is available.

Case two: the first information includes an association relationship between an index and a payload transmission resource.

The association relationship between the index and the payload transmission resource may include an association relation between all indexes and the payload transmission resource, or an association relationship between a part of indexes and the payload transmission resource. For example, in the random access, the index may be the index of the preamble sequence, so that the association relationship between the index and the payload transmission resource may specifically include an association relation between all preambles and the payload transmission resource, or an association relationship between a part of preambles and the payload transmission resource.

In this case, in step S33, determining that the first index satisfies the first preset rule according to the first information includes determining that the first index belongs to one of specified indexes in indexes associated with one payload transmission resource according to the association relationship between the index and the payload transmission resource; or determining that the first index belongs to a second index set according to the association relationship between the index and the payload transmission resource, where the second index set is acquired according to the association relationship between the index and the payload transmission resource; or determining that the first index has an association relationship with at least one payload transmission resource according to the association relationship between the index and the payload transmission resource; or determining that a payload transmission resource associated with the first index is available according to the association relationship between the index and the payload transmission resource.

In one example, acquiring the second index set according to the association relationship between the index and the payload transmission resource includes acquiring Q indexes in P indexes associated with each payload transmission resource in specified payload transmission resources according to the association relationship between the index and the payload transmission resource, and using the Q indexes as indexes in the second index set to obtain the second index set, where P is an integer, Q is an integer, and Q is less than or equal to P.

In one example, it is determined that the payload transmission resource associated with the first index is available according to the association relationship between the index and the payload transmission resource, and it is determined that transmission resources used for transmitting a sequence indicated by the first index are available.

In one example, determining that the payload transmission resource associated with the first index is available according to the association relationship between the index and the payload transmission resource may be implemented in combination with information on whether the payload transmission resource is available.

Case three: the first information includes an association relationship between a preamble transmission resource and a payload transmission resource.

In this case, in step S33, determining that the first index satisfies the first preset rule according to the first information includes determining that a remainder of the first index to a first specified value is equal to a second specified value according to the association relationship between the preamble transmission resource and the payload transmission resource; or determining that a ratio of the first index to a number of indexes is located within a specified value range according to the association relationship between the preamble transmission resource and the payload transmission resource; or determining that the first index belongs to a third index set according to the association relationship between the preamble transmission resource and the payload transmission resource, where the third index set is acquired according to the association relationship between the preamble transmission resource and the payload transmission resource; or determining that a payload transmission resource associated with a first preamble transmission resource is available according to the association relationship between the preamble transmission resource and the payload transmission resource, where the first preamble transmission resource is used for transmitting a sequence indicated by the first index.

In one example, the first specified value is determined according to the association between the preamble transmission resource and the payload transmission resource, or is preset, or is determined according to a code rate or a modulation and coding scheme (MCS) used by the payload transmission.

In one example, the second specified value may be 0, or an index of the preamble transmission resource, or be determined according to the number or indexes of preamble transmission resources associated with one payload transmission resource.

In one example, the specified value range is determined according to the association between the preamble transmission resource and the payload transmission resource or is preset or is determined according to a code rate or an MCS used by the payload transmission.

In one example, acquiring the third index set according to the association relationship between the preamble transmission resource and the payload transmission resource includes obtaining a preamble transmission resource associated with each payload transmission resource and available indexes according to the association relationship between the preamble transmission resource and the payload transmission resource, and using specified indexes in the available indexes as indexes in the third index set to obtain the third index set.

In one example, it is determined that a payload transmission resource associated with a first preamble transmission resource is available according to the association relationship between the preamble transmission resource and the payload transmission resource, and it is determined that the first preamble transmission resource is available.

In one example, determining that the payload transmission resource associated with the first preamble transmission resource is available according to the association relationship between the preamble transmission resource and the payload transmission resource may be implemented in combination with information on whether the payload transmission resource is available.

Case four: the first information includes an association relationship among an index, a payload transmission resource and a DMRS.

The association relationship among the index, the payload transmission resource and the DMRS may include an association relation among all indexes, the payload transmission resource and the DMRS, or an association relationship among a part of indexes, the payload transmission resource and the DMRS. For example, in the random access, the index may be the index of the preamble sequence, so that the association relationship between the index, the payload transmission resource and the DMRS may specifically include an association relation among all preambles, the payload transmission resource and the DMRS, or an association relationship among a part of preambles, the payload transmission resource and the DMRS.

In this case, in step S33, determining that the first index satisfies the first preset rule according to the first information includes determining that the first index belongs to one of specified indexes in indexes associated with one resource set according to the association relationship among the index, the payload transmission resource and the DMRS; or determining that the first index belongs to a fourth index set according to the association relationship among the index, the payload transmission resource and the DMRS, where the fourth index set is acquired according to the association relationship among the index, the payload transmission resource and the DMRS; or determining that the first index has an association relationship with at least one resource set according to the association relationship among the index, the payload transmission resource and the DMRS; or determining that a resource set associated with the first index is available according to the association relationship among the index, the payload transmission resource and the DMRS. The resource set consists of a specified payload transmission resource and a specified DMRS.

In one example, acquiring the fourth index set according to the association relationship among the index, the payload transmission resource and the DMRS includes acquiring T indexes in S indexes associated with each resource set in specified resource sets according to the association relationship among the index, the payload transmission resource and the DMRS, and using the T indexes as indexes in the fourth index set to obtain the fourth index set, where the resource set consists of the specified payload transmission resource and the specified DMRS, S is an integer, T is an integer, and T is less than or equal to S.

In one example, it is determined that the resource set associated with the first index is available according to the association relationship among the index, the payload transmission resource and the DMRS, and it is determined that transmission resources used for transmitting a sequence indicated by the first index are available.

In one example, determining that the resource set associated with the first index is available according to the association relationship among the index, the payload transmission resource and the DMRS may be implemented in combination with information on whether the resource set is available.

Case five: the first information includes a fifth index set.

The fifth index set may include a sequence index set or a logical index set, and may be semi-statically configured by a system or configured by a system broadcast. For example, the system may semi-statically configure or broadcast configure the minimum index value and/or the maximum index value of the index set to save signaling overhead.

In this case, in step S33, determining that the first index satisfies the first preset rule according to the first information includes determining that the first index belongs to the fifth index set according to the fifth index set.

In one example, the first information includes indication information used for indicating transmission content.

The transmission content includes a sequence indicated by the first index and a payload, or the payload, or the sequence indicated by the first index, or no content is transmitted.

When the first information includes indication information for indicating the transmission content, the content to be transmitted may be determined according to the indication information, and the step of determining whether the first index satisfies the first preset rule according to the first information may no longer be performed.

In this embodiment of the present application, in response to determining that the first index satisfies a first preset rule according to the first information, it is determined that content to be transmitted includes a first message, so that a transmission of the first message can be controlled, thereby reducing the collision of transmission resources, reducing the waste of transmission resources, and improving the access efficiency of the system and transmission performance of the system.

Further, in the random access process, whether the UE uses the 2-step RACH may be controlled according to the PUSCH collision in the 2-step RACH, thereby the collision of the payload transmitted on the PUSCH can be reduced, the transmission resource waste problem caused by the transmission failure of the PUSCH can be reduced, the transmission performance of the payload and the access efficiency of the system and the transmission performance of the system can be improved.

Figure 5:
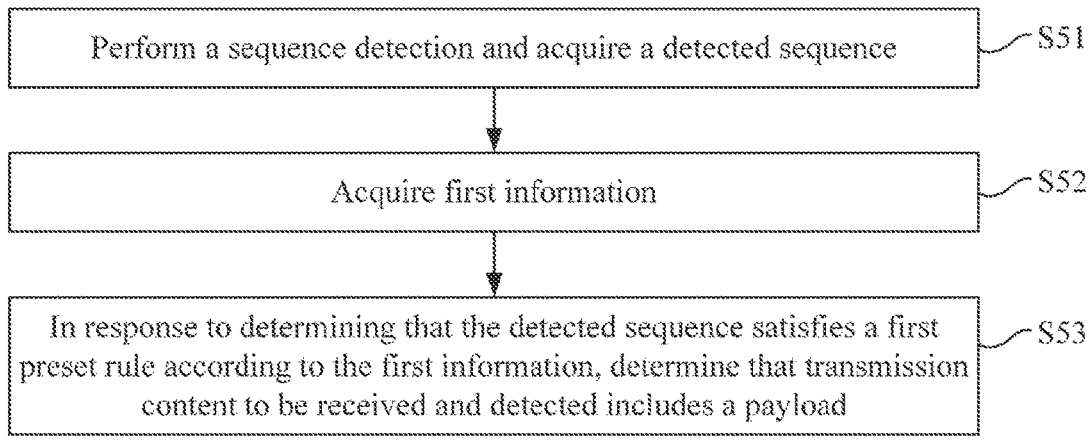
FIG. 5 is a flowchart of a transmission method according to another embodiment of the present application.

FIG. 5 is a flowchart of a transmission method according to another embodiment of the present application. As shown in FIG. 5, the method may include steps described below.

In step S51, a sequence detection is performed and a detected sequence is acquired.

In step S52, first information is acquired.

In step S53, in response to determining that the detected sequence satisfies a first preset rule according to the first information, it is determined that transmission content to be received and detected includes a payload.

In one embodiment, the first information includes at least one of: an association relationship between an index and a DMRS, an association relationship between an index and a payload transmission resource, an association relationship between a preamble transmission resource and a payload transmission resource, an association relationship among an index, a payload transmission resource and a DMRS, and an index set.

In one embodiment, the first information includes indication information used for indicating transmission content. The transmission content includes a sequence and a payload, or the payload, or the sequence, or no content is transmitted. When the first information includes the indication information for indicating the transmission content, the transmission content to be received and detected may be determined according to the indication information, and the step of determining whether the detected sequence satisfies the first preset rule according to the first information may no longer be performed.

In one example, after it is determined that the transmission content to be received and detected includes the payload, the method also needs to receive and detect the payload.

In one example, in response to determining that the detected sequence does not satisfy the first preset rule according to the first information, the method does not need to perform other detections.

In this embodiment, the specific method for determining that the detected sequence satisfies the first preset rule according to the first information is similar to the method for determining that the first index satisfies the first preset rule according to the first information in the above embodiment and will not be described here.

Figure 6:
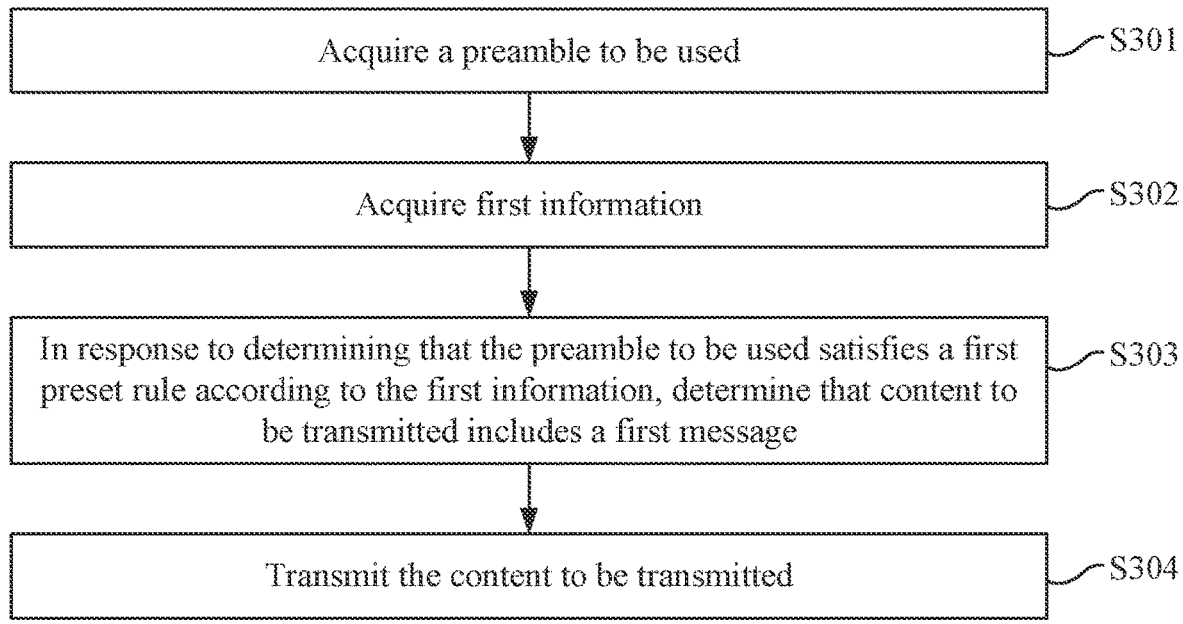
FIG. 6 is a flowchart of a random access method according to an embodiment of the present application.

FIG. 6 is a flowchart of a random access method according to an embodiment of the present application. The method may be applied to a transmitter including but not limited to a terminal, a user equipment and the like.

As shown in FIG. 6, in this embodiment, the first index is an index of a preamble to be used. Since the preamble index represents one preamble, in this embodiment, the preamble index and the preamble are no longer strictly distinguished, and the preamble is uniformly used for description. The method may include steps described below.

In step S301, the preamble to be used is acquired.

In one example, the step in which the preamble to be used is acquired includes randomly selecting the preamble to be used or acquiring the preamble to be used according to the system configuration.

In step S302, first information is acquired.

The first information may include an association relationship between a preamble and a DMRS, or an association relationship between a preamble and a payload transmission resource, or an association relationship between a preamble transmission resource and a payload transmission resource, or an association relationship among a preamble and a payload transmission resource and a DMRS, or a preamble set.

In one example, the association relationship between the preamble and the DMRS includes an association relation between all preambles and the DMRS, or an association relationship between a part of preambles and the DMRS.

In one example, the association relationship between the preamble and the payload transmission resource includes an association relation between all preambles and the payload transmission resource, or an association relationship between a part of preambles and the payload transmission resource.

In one example, the association relationship among the preamble, the payload transmission resource and the DMRS includes an association relation between all preambles, the payload transmission resource and the DMRS, or an association relationship between a part of preambles, the payload transmission resource and the DMRS.

In an embodiment of the present application, the payload transmission resource is a resource used for transmitting the payload, or a PUSCH. The payload transmission resource includes at least a time-domain resource and a frequency-domain resource, such as a resource block (RB), a symbol, a slot, a subframe, an occasion or the like.

In one example, the payload is a payload of a msgA in the 2-step RACH.

In one example, the payload may be used for carrying data information.

In one example, all preambles include all preambles being able to be used for the 2-step RACH, or all preambles in a specified preamble set, or all available preambles.

In one example, the part of preambles include a part of preambles in the preambles being able to be used for the 2-step RACH, or a part of preambles in a specified preamble set, or a part of preambles of all available preambles.

In an embodiment of the present application, the preamble transmission resource is a resource used for transmitting the preamble, or a resource used for the random access, or a PRACH. The preamble transmission resource includes at least a time-domain resource and a frequency-domain resource, such as an RB, a symbol, a slot, a subframe, an occasion or the like.

In step S303, in response to determining that the preamble to be used satisfies a first preset rule according to the first information, it is determined that content to be transmitted includes a first message.

The first message includes the preamble to be used and the payload, for example, the first message is the msgA in the 2-step RACH, or the first message includes the payload.

In addition, in response to determining that the preamble to be used does not satisfy the first preset rule according to the first information, it may be determined that the content to be transmitted is the preamble to be used, or no subsequent transmission may be performed.

A process of determining the content to be transmitted can be divided into the following cases according to different first information.

Case one: if the first information is the association relationship between the preamble and the DMRS, determining that the preamble to be used satisfies the first preset rule according to the first information includes determining that the preamble to be used belongs to one of specified preambles in preambles associated with one DMRS according to the association relationship between the preamble and the DMRS; or determining that the preamble to be used belongs to a first preamble set according to the association relationship between the preamble and the DMRS; or determining that the preamble to be used has an association relationship with at least one DMRS according to the association relationship between the preamble and the DMRS; or determining that a DMRS associated with the preamble to be used is available according to the association relationship between the preamble and the DMRS.

Acquiring the first preamble set according to the association relationship between the preamble and the DMRS specifically includes acquiring N preambles in M preambles associated with each DMRS in specified DMRSs according to the association relationship between the preamble and the DMRS, and using the N preambles as preambles in the first preamble set to finally obtain the first preamble set, where M is an integer, N is an integer, and N is less than or equal to M.

The specified DMRSs can be determined according to the number of DMRSs. or determined according to a code rate or an MCS used by the payload transmission. The code rate or MCS used by the payload transmission is related to the size of payload and the number of the payload transmission resource. For example, when the code rate or the MCS of the payload transmission is low, the more number of specified DMRSs can be considered. It can be seen that when the number of specify DMRSs is large, the number of preambles in the first preamble set is also large.

The number of preambles associated with each DMRS may be the same or may be different.

A value of N may be determined according to a value of M or according to the number of preambles and the number of DMRSs.

The N preambles include N preambles which are obtained at specified intervals with a specified preamble as a starting point among the M preambles. For example, the N preambles are the first N preambles of the M preambles, or the last N preambles of the M preambles, or intermediate N preambles of the M preambles, or the first N preamble with odd indexes of the M preambles, or the first N preambles with even indexes of the M preambles.

Determining that the DMRS associated with the preamble to be used is available according to the association relationship between the preamble and the DMRS may be implemented in combination with information on whether the DMRS is available or whether a time-frequency resource in which the DMRS is located is available.

Case two: if the first information is the association relationship between the preamble and the payload transmission resource, determining that the preamble to be used satisfies the first preset rule according to the first information includes determining that the preamble to be used belongs to one of specified preambles in preambles associated with one payload transmission resource according to the association relationship between the preamble and the payload transmission resource; or determining that the preamble to be used belongs to a second preamble set according to the association relationship between the preamble and the payload transmission resource; or determining that the preamble to be used has an association relationship with at least one payload transmission resource according to the association relationship between the preamble and the payload transmission resource; or determining that a payload transmission resource associated with the preamble to be used is available according to the association relationship between the preamble and the payload transmission resource.

Acquiring the second index set according to the association relationship between the preamble and the payload transmission resource specifically includes acquiring Q preambles in P preambles associated with each transmission resource in specified transmission resources according to the association relationship between the preamble and the payload transmission resource, and using the Q preambles as preambles in the second preamble set to finally obtain the second preamble set, where P is an integer, Q is an integer, and Q is less than or equal to P.

The number of preambles associated with each transmission resource may be the same or may be different.

A value of Q may be determined according to a value of P, or according to the number of preambles and the number of transmission resources, or according to the code rate or MCS used by the payload transmission. The code rate or MCS used by the payload transmission is related to the size of payload and the number of the payload transmission resource. For example, when the code rate or the MCS of the payload transmission is low, a value of Q may be large. It can be seen that when the value of Q is large, the number of preambles in the second preamble set is large. In addition, when the number of transmission resources is large, the number of preambles in the second preamble set is also large.

The Q preambles include Q preambles which are obtained at specified intervals with a specified preamble as a starting point among the P preambles. For example, the Q preambles are the first Q preambles of the P preambles, or the last Q preambles of the P preambles, or intermediate Q preambles of the P preambles, or the first Q preamble with odd indexes of the P preambles, or the first Q preambles with even indexes of the P preambles.

Determining that the payload transmission resource associated with the preamble to be used is available according to the association relationship between the preamble and the payload transmission resource may be implemented in combination with information on whether the payload transmission resource is available.

Case three, if the first information is the association relationship between the preamble transmission resource and the payload transmission resource, determining that the preamble to be used satisfies the first preset rule according to the first information includes determining that a remainder of the preamble to be used to a first specified value is equal to a second specified value according to the association relationship between the preamble transmission resource and the payload transmission resource; or determining that a ratio of a number of preambles to be used to a number of preambles is located within a specified value range according to the association relationship between the preamble transmission resource and the payload transmission resource; or determining that the preamble to be used belongs to a third preamble set according to the association relationship between the preamble transmission resource and the payload transmission resource; or determining that a payload transmission resource associated with a preamble transmission resource to be used is available according to the association relationship between the preamble transmission resource and the payload transmission resource.

The first specified value is determined according to the association between the preamble transmission resource and the payload transmission resource, or is preset, or is determined according to a code rate or an MCS used by the payload transmission. The code rate or MCS used by the payload transmission is related to the size of payload and the number of the payload transmission resource. For example, when the code rate or the MCS of the payload transmission is low, a value of the first specified value may be small.

The second specified value may be 0, or an index of the preamble transmission resource, or be determined according to the number or indexes of preamble transmission resources associated with one payload transmission resource.

The specified value range is determined according to the association between the preamble transmission resource and the payload transmission resource, or is preset, or is determined according to a code rate or an MCS used by the payload transmission. The code rate or MCS used by the payload transmission is related to the size of payload and the number of the payload transmission resource. For example, when the code rate or the MCS of the payload transmission is low, the specified value range may be large.

Acquiring the third preamble set according to the association relationship between the preamble transmission resource and the payload transmission resource specifically includes obtaining a preamble transmission resource associated with each payload transmission resource and available preambles according to the association relationship between the preamble transmission resource and the payload transmission resource, and using specified preambles in the available preambles as preambles in the third preamble set to obtain the third preamble set.

The preamble transmission resource to be used is used for transmitting the preamble to be used.

Determining that the payload transmission resource associated with the preamble transmission resource to be used is available according to the association relationship between the preamble transmission resource and the payload transmission resource may be implemented in combination with information on whether the payload transmission resource is available.

Case four: if the first information is the association relationship among the preamble, the payload transmission resource and the DMRS, determining that the first index satisfies the first preset rule according to the first information includes determining that the preamble to be used belongs to one of specified preambles in preambles associated with one resource set according to the association relationship among the preamble, the payload transmission resource and the DMRS; or determining that the preamble to be used belongs to a fourth preamble set according to the association relationship among the preamble, the payload transmission resource and the DMRS; or determining that the preamble to be used has an association relationship with at least one resource set according to the association relationship among the preamble, the payload transmission resource and the DMRS; or determining that a resource set associated with the preamble to be used is available according to the association relationship among the preamble, the payload transmission resource and the DMRS.

The resource set consists of a specified payload transmission resource and a specified DMRS.

Acquiring the fourth preamble set according to the association relationship among the preamble, the payload transmission resource and the DMRS includes acquiring T preambles in S preambles associated with each resource set in specified resource sets according to the association relationship among the preamble, the payload transmission resource and the DMRS, and using the T preambles as preambles in the fourth preamble set to obtain the fourth preamble set, where S is an integer, T is an integer, and T is less than or equal to S.

A value of T may be determined according to a value of S, or according to the number of preambles and the number of resource sets, or according to the code rate or the MCS used by the payload transmission. The code rate or MCS used by the payload transmission is related to the size of payload and the number of the payload transmission resource. For example, when the code rate or the MCS of the payload transmission is low, a value of T may be large. It can be seen that when the value of T is large, the number of preambles in the fourth preamble set is large. In addition, when the number of specified resource sets is large, the number of preambles in the fourth preamble set is also large.

Determining that the resource set associated with the preamble to be used is available according to the association relationship among the preamble, the payload transmission resource and the DMRS may be implemented in combination with information on whether the resource set is available.

Case five: the first information includes a fifth preamble set.

In this case, determining that the preamble to be used satisfies the first preset rule according to the first information includes determining that the preamble to be used belongs to the fifth preamble set according to the fifth preamble set.

In one example, the first information further includes indication information used for indicating transmission content.

The transmission content includes the preamble to be used and the payload, or the payload, or the preamble to be used, or no content is transmitted. For example, in the random access process, if the first information indicates a sending of a msgA, or the first information includes indication information for sending the msgA, it is determined that the content to be transmitted is the msgA. If the indication information is not received, it is determined that the content to be transmitted is the preamble to be used.

As no content is transmitted, it can be NULL or a reserved indication domain.

When the first information includes indication information for indicating the transmission content, the content to be transmitted may be determined according to the indication information, and the step of determining whether the preamble to be used satisfies the first preset rule according to the first information may no longer be performed.

In an embodiment, the method further includes a step described below.

In step S304, content to be transmitted is transmitted.

For example, if the content to be transmitted includes the preamble to be used and the payload, the preamble to be used may be sent through a PRACH, the payload may be sent through a PUSCH, or the preamble to be used and the payload may be sent through a PUSCH. If the content to be transmitted includes the payload, the payload may be sent through a PUSCH. If the content to be transmitted is the preamble to be used, the preamble to be used may be sent through a PRACH.

In this embodiment, the first information includes information configured by the system broadcast, or information pre-configured by the system, or information semi-statically configured by the system, or information dynamically configured by the system, or information carried by the system downlink control information.

In this embodiment, the association relationship between the preamble and the DMRS may be pre-configured by the system or configured by the system through signaling; or the association relationship between the preamble and the DMRS may also be acquired according to the association relationship between the preamble and the payload transmission resource, or the association relationship between the preamble transmission resource and the payload transmission resource, or the association relationship between the preamble and the resource set composed of the payload transmission resource and the DMRS.

In this embodiment, the association relationship between the preamble and the payload transmission resource may be pre-configured by the system or configured by the system through signaling; or the association relationship between the preamble and the payload transmission resource may also be acquired according to the association relationship between the preamble and the DMRS, or the association relationship between the preamble transmission resource and the payload transmission resource, or the association relationship between the preamble and the resource set composed of the payload transmission resource and the DMRS.

In this embodiment, the association relationship between the preamble transmission resource and the payload transmission resource may be pre-configured by the system or configured by the system through signaling; or the association relationship between the preamble transmission resource and the payload transmission resource may also be acquired according to the number of preamble transmission resources, the number of payload transmission resources and a preset rule, or according to an association relationship between a synchronization signal block (SSB) and the preamble transmission resource, the association relationship between the SSB and the payload transmission resource and the like.

In this embodiment, the association relationship between the preamble, the payload transmission resource and the DMRS may be pre-configured by the system or configured by the system through signaling; or the association relationship between the preamble, the payload transmission resource and the DMRS may also be acquired according to the association relationship between the preamble and the DMRS, or the association relationship between the preamble and the payload transmission resource, or the association relationship between the preamble transmission resource and the payload transmission resource.

In this embodiment, the preamble transmission resource includes a time-frequency domain resource, such as the PRACH or a PRACH occasion or an RACH occasion (RO). The payload transmission resource includes the time-frequency domain resource, such as a PUSCH or a PUSCH occasion (PO) or a payload occasion.

The embodiment of the present application provides a random access method in which it is possible to determine that the content to be transmitted is the msgA or the preamble according to the preamble to be used and first information. The method may control whether the UE uses the 2-step RACH according to the PUSCH collision in the 2-step RACH, thereby the collision of the payload transmitted on the PUSCH can be reduced, the transmission resource waste problem caused by the transmission failure of the PUSCH can be reduced, the transmission performance of the payload and the access efficiency of the system and the transmission performance of the system can be improved.

Figure 7:
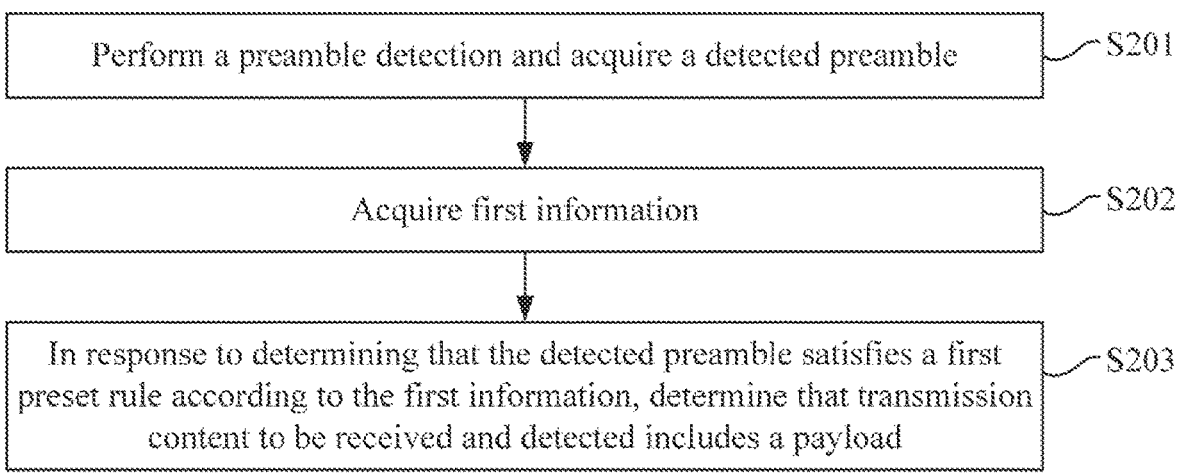
FIG. 7 is a flowchart of a random access method according to another embodiment of the present application.

FIG. 7 is a flowchart of a random access method according to another embodiment of the present application. The method may be applied to a receiver, such as a base station receiver, which may determine the transmission content to be received and detected according to a detected preamble and perform a corresponding detection.

As shown in FIG. 7, the method includes steps described below.

In step S201, a preamble detection is performed and a detected preamble is acquired.

In step S202, first information is acquired.

In step S203, in response to determining that the detected preamble satisfies a first preset rule according to the first information, it is determined that transmission content to be received and detected includes a payload.

The first information includes an association relationship between a preamble and a DMRS, or an association relationship between a preamble and a payload transmission resource, or an association relationship between a preamble transmission resource and a payload transmission resource, or an association relationship among a preamble and a payload transmission resource and a DMRS, or a preamble set.

In one example, the first information includes indication information used for indicating transmission content. The transmission content includes a preamble and a payload, or the payload, or the preamble, or no content is transmitted. When the first information includes the indication information for indicating the transmission content, the transmission content to be received and detected may be determined according to the indication information, and the step of determining whether the detected preamble satisfies the first preset rule according to the first information may no longer be performed.

In one example, after it is determined that the transmission content to be received and detected includes the payload, the method also needs to receive and detect the payload, for example, the content transmitted by the transmitter is a msgA in 2-step RACH.

In one example, in response to determining that the detected preamble does not satisfy the first preset rule according to the first information, the method does not need to perform other detections, for example, when the content transmitted by the transmitter is the preamble, since the preamble detection has been completed in step S201, no other receiving detection is required.

The specific method for determining that the detected preamble satisfies the first preset rule according to the first information is similar to the method of the transmitter for determining that the preamble to be used satisfies the first preset rule according to the first information in the above embodiment and will not be described here.

The random access method provided by the embodiment of the application not only can solve the influence caused by PUSCH collision, but also is beneficial for the receiver to distinguish the information sent by the transmitter, that is, to distinguish whether the UE uses the 2-step RACH or the 4-step RACH, thereby being beneficial to control or reduce the detection complexity of the receiver.

Implementation Mode 1

Figure 8:
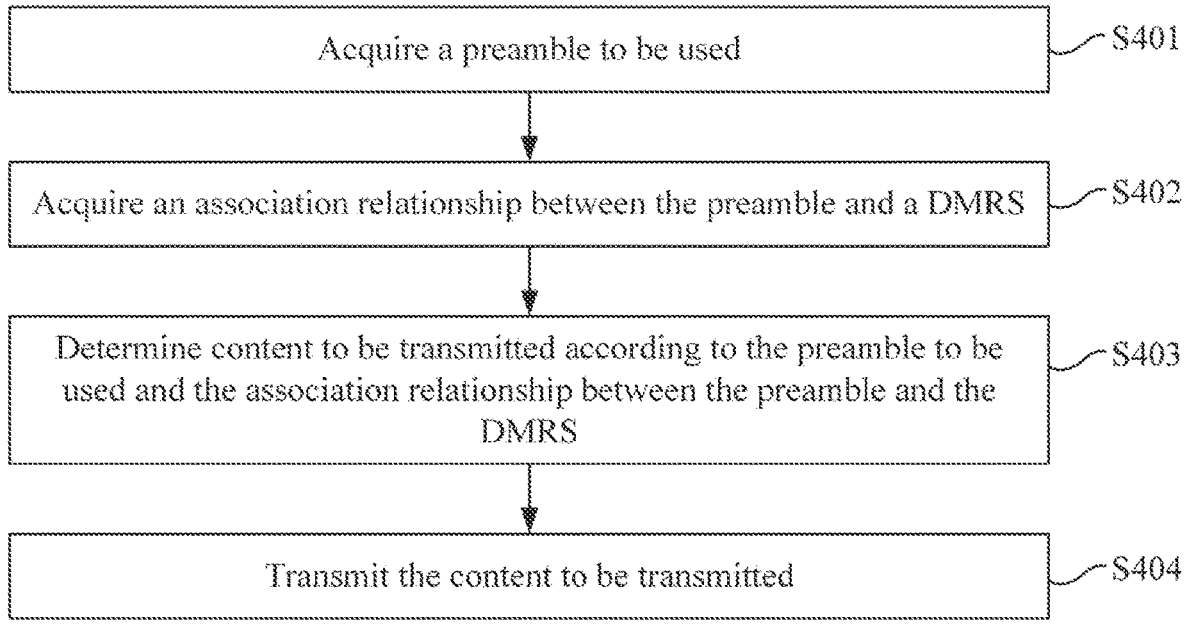
FIG. 8 is a flowchart of a random access method according to another embodiment of the present application.

The present embodiment provides a random access method applied to a transmitter, including but not limited to a terminal or a user equipment (UE). FIG. 8 is a flowchart of a random access method according to another embodiment of the present application. As shown in FIG. 8, the method includes steps described below.

In step S401, a preamble to be used is acquired.

Specifically, a UE acquires the preamble to be used through random selection, or a UE acquires the preamble to be used according to a system configuration, where the system configuration includes radio resource control (RRC) signaling, downlink control information (DCI) and the like.

The UE acquires a preamble to be used, may acquire an index of the preamble and generates a preamble sequence corresponding to the index according to the index; or the UE acquires a preamble sequence corresponding to the index from a preamble sequence sets according to the index.

In step S402, an association relationship between the preamble and a DMRS is acquired.

The association relationship between the preamble and the DMRS includes an association relation between all preambles and the DMRS, or an association relationship between a part of preambles and the DMRS.

All preambles include all preambles being able to be used for 2-step RACH, or all preambles in a specified preamble set, or all available preambles.

The part of preambles include a part of preambles in the preambles being able to be used for the 2-step RACH, or a part of preambles in a specified preamble set, or a part of preambles of all available preambles.

In step S403, content to be transmitted is determined according to the preamble to be used and the association relationship between the preamble and the DMRS. Specifically, it is determined that whether the preamble to be used satisfies the first preset rule according to the association relationship between the preamble and the DMRS. If the preamble to be used satisfies the first preset rule, the UE determines that the content to be transmitted is a first message. The first message is a msgA in the 2-step RACH, where the msgA includes the preamble to be used and the payload, or the first message includes the payload. If the preamble to be used does not satisfy the first preset rule, the UE determines that the content to be transmitted is the preamble to be used, or the UE does not transmit.

In this step, determining that whether the preamble to be used satisfies the first preset rule according to the association relationship between the preamble and the DMRS includes at least one of the following manners.

(1) The UE determines that whether the preamble to be used belongs to one of specified preambles in preambles associated with one DMRS according to the association relationship between the preamble and the DMRS. If the preamble to be used belongs to one of specified preambles in preambles associated with one DMRS, it is considered that the preamble to be used satisfies the first preset rule. For example, the UE determines that the content to be transmitted is the msgA. That is, the UE performs the random access according to the 2-step RACH. If the preamble to be used does not belong to one of specified preambles in preambles associated with one DMRS, it is considered that the preamble to be used does not satisfy the first preset rule. For example, the UE determines that the content to be transmitted is the preamble to be used. That is, the UE merely sends the preamble and performs the random access according to the 4-step RACH.

In this manner, there are multiple methods to determine that whether the preamble to be used belongs to the one of specified preambles in the preambles associated with the one DMRS. For example, the UE may acquire M preambles associated with one DMRS according to the association relationship between the preamble and the DMRS. If the preamble to be used is one of N preambles in the M preambles, it is considered that the preamble to be used belongs to one of the specified preambles in the preambles associated with one DMRS.

According to this manner, for the M preambles associated with one DMRS, N preambles in the M preambles may be used for the 2-step RACH, and if other preambles are used, even if the UE supports a function of the 2-step RACH, the UE also performs the random access according to the 4-step RACH.

(2) The UE acquires a first preamble set according to the association relationship between the preamble and the DMRS, and if the preamble to be used is included in the first preamble set, it is considered that the preamble to be used satisfies the first preset rule. For example, the UE determines that the content to be transmitted is the msgA. If the preamble to be used does not include in the first preamble set, it is considered that the preamble to be used does not satisfy the first preset rule. For example, the UE determines that the content to be transmitted is the preamble to be used.

In this manner, the UE acquires the first preamble set according to the association relationship between the preamble and the DMRS that including the UE acquires N preambles in M preambles associated with each DMRS in specified DMRSs according to the association relationship between the preamble and the DMRS, and the N preambles are used as preambles in the first preamble set to finally obtain the first preamble set.

The specified DMRSs here may be all DMRSs or a part of DMRSs. For example, when there are multiple groups of DMRSs, the specified DMRSs may be one group of multiple groups of DMRSs. The specified DMRSs can be determined according to the number of DMRSs, or according to a code rate or an MCS used by the payload transmission. The code rate or MCS used by the payload transmission is related to the size of payload and the number of the payload transmission resource. For example, when the code rate or the MCS of the payload transmission is low, the more number of specified DMRSs can be considered.

According to this manner, preambles in the first preamble set may be used for the 2-step RACH, and if other preambles are used, even if the UE supports a function of the 2-step RACH, the UE also performs the random access according to the 4-step RACH.

(3) The UE determines that whether the preamble to be used has an association relationship with at least one DMRS according to the association relationship between the preamble and the DMRS. If the preamble to be used has the association relationship with at least one DMRS, it is considered that the preamble to be used satisfies the first preset rule. For example, the UE determines that the content to be transmitted is the msgA. If the preamble to be used does not have the association relationship with at least one DMRS, it is considered that the preamble to be used does not satisfy, the first preset rule. For example, the UE determines that the content to be transmitted is the preamble to be used.

(4) The UE determined that whether a DMRS associated with the preamble to be used is available according to the association relationship between the preamble and the DMRS. If the DMRS associated with the preamble to be used is available, it is considered that the preamble to be used satisfies the first preset rule. For example, the UE determines that the content to be transmitted is the msgA. If the DMRS associated with the preamble to be used is not available, it is considered that the preamble to be used does not satisfy the first preset rule. For example, the UE determines that the content to be transmitted is the preamble to be used, or the UE does not transmit.

In this manner, the UE determines that whether the DMRS associated with the preamble to be used is available according to the association relationship between the preamble and the DMRS, which may be implemented in combination with information on whether the DMRS is available or whether a time-frequency resource in which the DMRS is located is available.

According to this manner, when the DMRS associated with the preamble to be used is available, the UE may perform the 2-step RACH, and if the DMRS associated with the preamble to be used is not available, even if the UE supports a function of the 2-step RACH, the UE also performs the random access according to the 4-step RACH or abandons this access attempt.

In the above first manner, second manner and fourth manner, the association relationship between the preamble and the DMRS may be the association relation between all preambles and the DMRS, or may also be the association relationship between a part of preambles and the DMRS.

In the above third manner, the association relationship between the preamble and the DMRS may specifically be the association relationship between the part of preambles and the DMRS. The UE determines that whether the preamble to be used has the association relationship with at least one DMRS according to the association relationship between the part of preambles and the DMRS, that is, it is determined that whether the preamble to be used is one of the part of preambles. It can be seen that in this manner, the part of preambles may be used for the 2-step RACH, and if other preambles are used, even if the UE supports the function of the 2-step RACH, the UE also performs the random access according to the 4-step RACH.

It is to be noted that the number of preambles associated with each DMRS may be the same or may be different.

In the above description, M is an integer, N is an integer, and N is less than or equal to M. A value of N may be determined according to a value of M or according to the number of preambles and the number of DMRSs.

Specifically, the above N preambles include N preambles which are obtained at specified intervals with a specified preamble as a starting point among the M preambles. For example, the N preambles are the first N preambles of the M preambles, or the last N preambles of the M preambles, or intermediate N preambles of the M preambles, or the first N preamble with odd indexes of the M preambles, or the first N preambles with even indexes of the M preambles.

In this embodiment, the method further includes a step described below.

In step S404, the content to be transmitted is transmitted.

Specifically, if the content to be transmitted is the msgA, the preamble may be sent through a PRACH, the payload may be sent through a PUSCH, or the msgA may be sent through a PUSCH. If the content to be transmitted is a preamble, the preamble may be sent through the PRACH.

In this embodiment, the association relationship between the preamble and the DMRS may be broadcasted by the system or pre-configured by the system or semi-statically configured by the system, or the association relationship between the preamble and the DMRS may also be acquired according to the association relationship between the preamble and the payload transmission resource, or the association relationship between the preamble transmission resource and the payload transmission resource, or the association relationship between the preamble and the resource set, where the resource set includes the payload transmission resource and the DMRS.

The preamble transmission resource includes the PRACH or a PRACH occasion or an RACH occasion. The payload transmission resource includes the PUSCH or a PUSCH occasion or a payload occasion.

The random access method of this embodiment can determine that the content to be transmitted is the msgA or the preamble according to the association relationship among the preamble to be used, the preamble and the DMRS. The method may control whether the UE uses the 2-step RACH according to the PUSCH collision in the 2-step RACH, thereby the collision of the payload transmitted on the PUSCH can be reduced, the transmission resource waste problem caused by the transmission failure of the PUSCH can be reduced, the transmission performance of the payload and the access efficiency of the system and the transmission performance of the system can be improved.

When the number of DMRS are small and the number of preambles associated with each DMRS are large, the number of UEs using a same PUSCH to send the payload may be large, and there will be serious PUSCH collision, thereby affecting the payload transmission performance, and causing many UES to fall back from the 2-step RACH to the 4-step RACH, and then causing waste of transmission resources, affecting the access efficiency of the system and the transmission performance of the system. According to the method of this embodiment, whether the UE uses the 2-step RACH may be controlled, that is, the UE is controlled to send the msgA or the preamble, so that the PUSCH collision can be reduced, the payload transmission performance can be improved, many UEs can be prevented from falling back, the waste of transmission resources can be avoided, and the access efficiency of the system and the transmission performance of the system can be improved.

In one example, only one of the M preambles associated with each DMRS can be allowed for the 2-step RACH, so that DMRS collisions can be avoided or the PUSCH collisions can be controlled.

Implementation Mode 2

Figure 9:
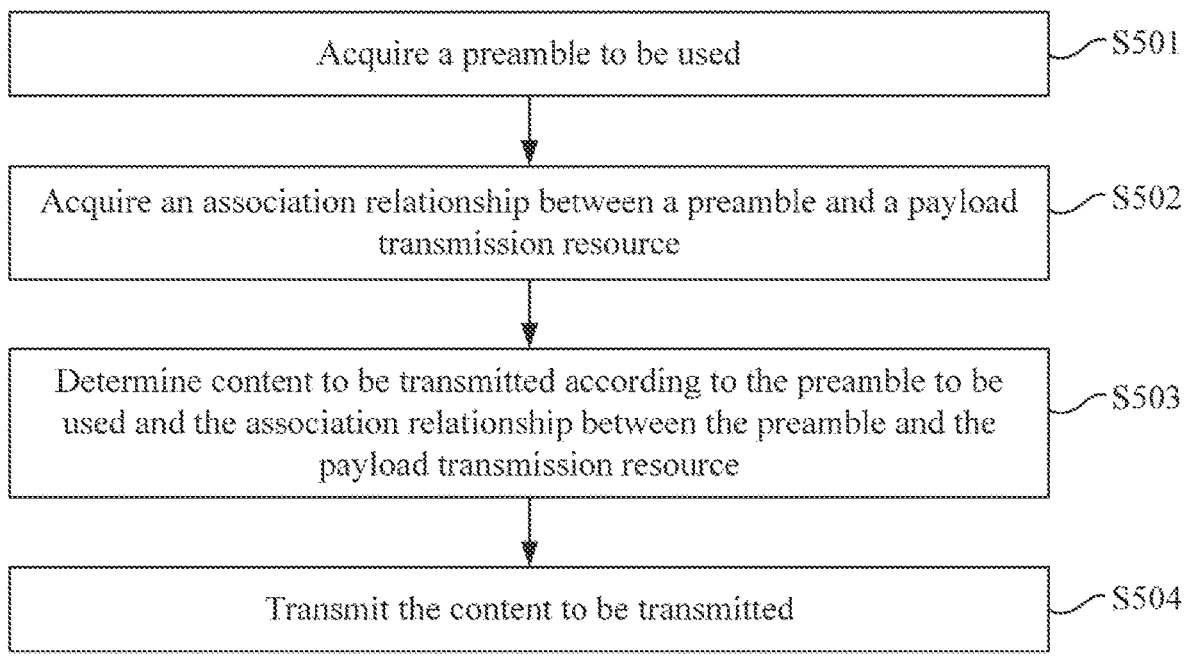
FIG. 9 is a flowchart of a random access method according to another embodiment of the present application.

The present embodiment provides a random access method applied to a transmitter, including but not limited to a terminal or a user equipment (UE). FIG. 9 is a flowchart of a random access method according to another embodiment of the present application. As shown in FIG. 9, the method includes steps described below.

In step S501, a preamble to be used is acquired.

Specifically, the UE acquires a preamble to be used through random selection or the UE acquires a preamble to be used according to the system configuration.

In step S502, an association relationship between a preamble and a payload transmission resource is acquired.

The association relationship between the preamble and the payload transmission resource includes an association relation between all preambles and the payload transmission resource, or an association relationship between a part of preambles and the payload transmission resource.

The payload transmission resource is a transmission resource used for transmitting the payload.

The payload is a payload in a msgA in 2-step RACH; or the payload is used for carrying data information.

The payload transmission resource includes a PUSCH or a PUSCH occasion or a payload occasion.

All preambles include all preambles being able to be used for the 2-step RACH, or all preambles in a specified preamble set, or all available preambles.

The part of preambles include a part of preambles in the preambles being able to be used for the 2-step RACH, or a part of preambles in a specified preamble set, or a part of preambles of all available preambles.

In step S503, content to be transmitted is determined according to the preamble to be used and the association relationship between the preamble and the payload transmission resource. Specifically, the UE determines that whether the preamble to be used satisfies the first preset rule according to the association relationship between the preamble and the payload transmission resource. If the preamble to be used satisfies the first preset rule, the UE determines that the content to be transmitted is a first message. The first message is the msgA in the 2-step RACH, where the msgA includes the preamble to be used and the payload, or the first message includes the payload. If the preamble to be used does not satisfy the first preset rule, the UE determines that the content to be transmitted is the preamble to be used, or the UE does not transmit.

In this step, the UE determines that whether the preamble to be used satisfies the first preset rule according to the association relationship between the preamble and the payload transmission resource, which includes at least one of the following manners.

(1) The UE determines that whether the preamble to be used belongs to one of specified preambles in preambles associated with one payload transmission resource according to the association relationship between the preamble and the payload transmission resource. If the preamble to be used belongs to the one of specified preambles in the preambles associated with the one payload transmission resource, it is considered that the preamble to be used satisfies the first preset rule. For example, the UE determines that the content to be transmitted is the msgA, where the msgA includes the preamble to be used and the payload. That is, the UE performs the random access according to the 2-step RACH. If the preamble to be used does not belong to the one of specified preambles in the preambles associated with the one payload transmission resource, it is considered that the preamble to be used does not satisfy the first preset rule. For example, the UE determines that the content to be transmitted is the preamble to be used. That is, the UE merely sends the preamble and performs the random access according to the 4-step RACH.

In this manner, there are multiple methods to determine that whether the preamble to be used belongs to the one of specified preambles in the preambles associated with the one payload transmission resource. For example, the UE may acquire P preambles associated with one payload transmission resource according to the association relationship between the preamble and the payload transmission resource. If the preamble to be used is one of Q preambles in the P preambles, it is considered that the preamble to be used belongs to one of the specified preambles in the preambles associated with one payload transmission resource.

In this manner, for the P preambles associated with one payload transmission resource, Q preambles in the P preambles may be used for the 2-step RACH, and if other preambles are used, even if the UE supports a function of the 2-step RACH, the UE also performs the random access according to the 4-step RACH.

(2) The UE acquires a second preamble set according to the association relationship between the preamble and the payload transmission resource, and if the preamble to be used is included in the second preamble set, it is considered that the preamble to be used satisfies the first preset rule. For example, the UE determines that the content to be transmitted is the msgA. If the preamble to be used is not included in the second preamble set, it is considered that the preamble to be used does not satisfy the first preset rule. For example, the UE determines that the content to be transmitted is the preamble to be used.

In this manner, the UE acquires the second preamble set according to the association relationship between the preamble and the payload transmission resource that including the UE acquires Q preambles in P preambles associated with each transmission resource in specified transmissions according to the association relationship between the preamble and the payload transmission resource, and the Q preambles are used as preambles in the second preamble set to finally obtain the second preamble set.

The specified transmission resources here may be all available transmission resources or a part of available transmission resources. For example, when there are multiple groups of transmission resources, the specified transmission resources may be one group of multiple groups of transmission resources.

In this manner, preambles in the second preamble set may be used for the 2-step RACH, and if other preambles are used, even if the UE supports a function of the 2-step RACH, the UE also performs the random access according to the 4-step RACH.

(3) The UE determines that whether the preamble to be used has an association relationship with at least one payload transmission resource according to the association relationship between the preamble and the payload transmission resource. If the preamble to be used has the association relationship with at least one payload transmission resource, it is considered that the preamble to be used satisfies the first preset rule. For example, the UE determines that the content to be transmitted is the msgA. If the preamble to be used has not the association relationship with at least one payload transmission resource, it is considered that the preamble to be used does not satisfy the first preset rule. For example, the UE determines that the content to be transmitted is the preamble to be used.

(4) The UE determines that whether a payload transmission resource associated with the preamble to be used is available according to the association relationship between the preamble and the payload transmission resource. If the payload transmission resource associated with the preamble to be used is available, it is considered that the preamble to be used satisfies the first preset rule. For example, the UE determines that the content to be transmitted is the msg A. If the payload transmission resource associated with the preamble to be used is not available, it is considered that the preamble to be used does not satisfy the first preset rule. For example, the UE determines that the content to be transmitted is the preamble to be used, or the UE does not transmit.

In this manner, the UE determines that whether the payload transmission resource associated with the preamble to be used is available according to the association relationship between the preamble and the payload transmission resource, which may be implemented in combination with information on whether the payload transmission resource is available.

According to this manner, when the payload transmission resource associated with the preamble to be used is available, the UE may perform the 2-step RACH, and if the payload transmission resource associated with the preamble to be used is not available, even if the UE supports a function of the 2-step RACH, the UE also performs the random access according to the 4-step RACH or abandons this access attempt.

In the above first manner, second manner and fourth manner, the association relationship between the preamble and the payload transmission resource may be an association relation between all preambles and the payload transmission resource, or may be an association relationship between a part of preambles and the payload transmission resource.

In the above third manner, the association relationship between the preamble and the payload transmission resource may specifically be the association relationship between the part of preambles and the payload transmission resource. The UE determines that whether the preamble to be used has the association relationship with at least one payload transmission resource according to the association relationship between the part of preambles and the payload transmission resource, that is, it is determined that whether the preamble to be used is one of the part of preambles. It can be seen that in this manner, the part of preambles may be used for the 2-step RACH, and if other preambles are used, even if the UE supports the function of the 2-step RACH, the UE also performs the random access according to the 4-step RACH.

It is to be noted that the number of preambles associated with each transmission resource may be the same or may be different.

In the above description, P is an integer, Q is an integer, and Q is less than or equal to P. A value of Q may be determined according to a value of P or according to the number of preambles and the number of transmission resources or according to the code rate or the MCS used by the payload transmission. The code rate or MCS used by the payload transmission is related to the size of payload and the number of the payload transmission resource. For example, when the code rate or the MCS of the payload transmission is low, a value of Q may be large.

Specifically, the above Q preambles include Q preambles which are obtained at specified intervals with a specified preamble as a starting point among the P preambles. For example, the Q preambles are the first Q preambles of the P preambles, or the last Q preambles of the P preambles, or intermediate Q preambles of the P preambles, or the first Q preamble with odd indexes of the P preambles, or the first Q preambles with even indexes of the P preambles.

In this embodiment, the method further includes a step described below.

In step S504, content to be transmitted is transmitted.

Specifically, if the content to be transmitted is the msgA, the preamble may be sent through a PRACH, the payload may be sent through a PUSCH, or the msgA may be sent through a PUSCH. If the content to be transmitted is a preamble, the preamble may be sent through the PRACH.

In this embodiment, the association relationship between the preamble and the payload transmission resource may be broadcasted by the system or pre-configured by the system or semi-statically configured by the system; or the association relationship between the preamble and the payload transmission resource may also be acquired according to the association relationship between the preamble and the DMRS, or the association relationship between the preamble transmission resource and the payload transmission resource, or the association relationship between the preamble and the resource set, where the resource set includes the payload transmission resource and the DMRS.

The preamble transmission resource includes the PRACH or a PRACH occasion or an RACH occasion. The payload transmission resource includes the PUSCH or a PUSCH occasion or a payload occasion.

The random access method of this embodiment can determine that the content to be transmitted is the msgA or the preamble according to the association relationship among the preamble to be used, the preamble and the payload transmission resource. The method may control whether the UE uses the 2-step RACH according to the PUSCH collision in the 2-step RACH, thereby the collision of the payload transmitted on the PUSCH can be reduced, the transmission resource waste problem caused by the transmission failure of the PUSCH can be reduced, the transmission performance of the payload and the access efficiency of the system and the transmission performance of the system can be improved.

When the number of payload transmission resource are small and the number of preambles associated with each payload transmission resource are large, the number of UEs using a same PUSCH to send the payload may be large, and there will be serious PUSCH collision, thereby affecting the payload transmission performance. Therefore, many UEs are caused to fall back from the 2-step RACH to the 4-step RACH, thus causing waste of transmission resources and affecting access efficiency of the system and the transmission performance of the system. According to the method of this embodiment, whether the UE uses the 2-step RACH may be controlled, that is, the UE is controlled to send the msgA or the preamble, so that the PUSCH collision can be reduced, the payload transmission performance can be improved, many UEs can be prevented from falling back, the waste of transmission resources can be avoided, and the access efficiency of the system and the transmission performance of the system can be improved.

Implementation Mode 3

Figure 10:
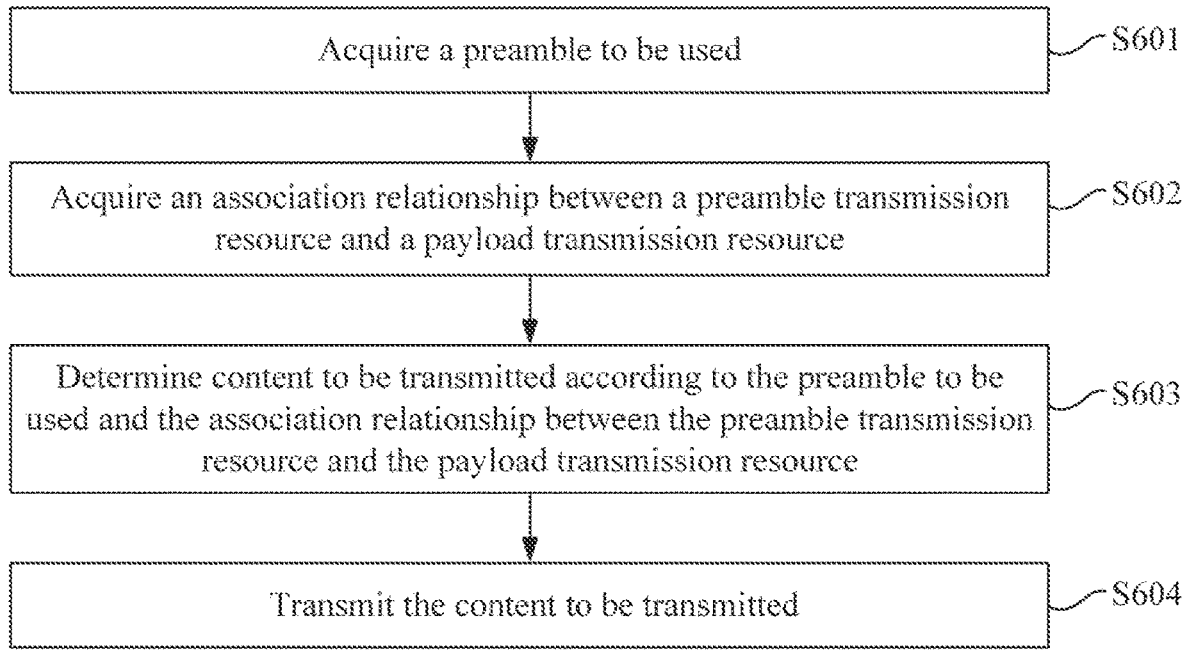
FIG. 10 is a flowchart of a random access method according to another embodiment of the present application.

The present embodiment provides a random access method applied to a transmitter, including but not limited to a terminal or a user equipment (UE). FIG. 10 is a flowchart of a random access method according to another embodiment of the present application. As shown in FIG. 10, the method includes steps described below.

In step S601, a preamble to be used is acquired.

Specifically, the UE acquires the preamble to be used through random selection or the UE acquires the preamble to be used according to the system configuration.

In step S602, an association relationship between a preamble transmission resource and a payload transmission resource is acquired.

The preamble transmission resource includes a PRACH or a PRACH occasion or an RACH occasion.

The payload transmission resource includes a PUSCH or a PUSCH occasion or a payload occasion.

The association relationship between the preamble transmission resource and the payload transmission resource may be a one-to-one relationship or a many-to-one relationship, etc.

In step S603, content to be transmitted is determined according to the preamble to be used and the association relationship between the preamble transmission resource and the payload transmission resource. Specifically, the UE determines that whether the preamble to be used satisfies a first preset rule according to the association relationship between the preamble transmission resource and the payload transmission resource. If the preamble to be used satisfies the first preset rule, the UE determines that the content to be transmitted is a first message. The first message is a msgA in 2-step RACH, where the msgA includes the preamble to be used and the payload, or the first message includes the payload. If the preamble to be used does not satisfy the first preset rule, the UE determines that the content to be transmitted is the preamble to be used, or the UE does not transmit.

In this step, the UE determines that whether the preamble to be used satisfies the first preset rule according to the association relationship between the preamble transmission resource and the payload transmission resource, which includes at least one of the following manners.

(1) The UE determines that whether a remainder of the preamble to be used to a first specified value is equal to a second specified value according to the association relationship between the preamble transmission resource and the payload transmission resource. If the remainder of the preamble to be used to the first specified value is equal to the second specified value, it is considered that the preamble to be used satisfies the first preset rule. For example, the UE determines that the content to be transmitted is the msgA. If the remainder of the preamble to be used to the first specified value is not equal to the second specified value, it is considered that the preamble to be used does not satisfy the first preset rule. For example, the UE determines that the content to be transmitted is the preamble to be used.

The first specified value may be determined according to the association relationship between the preamble transmission resource and the payload transmission resource. For example, the number of preamble transmission resources associated with each payload transmission resource may be obtained according to the association relationship between the preamble transmission resource and the payload transmission resource, and the first specified value is determined according to the number of preamble transmission resources associated with each payload transmission resource. The first specified value may also be preset or may also be determined according to a code rate or an MCS used by the payload transmission.

The second specified value may be 0, or an index of the preamble transmission resource, or be determined according the number or indexes of preamble transmission resources associated with one payload transmission resource. For example, if there are two preamble transmission resources associated with one payload transmission resource, the second specified values are respectively 0, 1, or 1, 2 for the two preamble transmission resources.

(2) The UE determines that whether a ratio of the number of preambles to be used to the number of preambles is located within a specified value range according to the association relationship between the preamble transmission resource and the payload transmission resource. If the ratio of the number of preambles to be used to the number of preambles is located within the specified value range, it is considered that the preamble to be used satisfies the first preset rule. For example, the UE determines that the content to be transmitted is the msgA. If the ratio of the number of preambles to be used to the number of preambles is not located within the specified value range, it is considered that the preamble to be used does not satisfy the first preset rule. For example, the UE determines that the content to be transmitted is the preamble to be used.

The specified value range may be determined according to the association relationship between the preamble transmission resource and the payload transmission resource. For example, the number of preamble transmission resources associated with each payload transmission resource may be obtained according to the association relationship between the preamble transmission resource and the payload transmission resource, and the specified value range is determined according to the number of preamble transmission resources associated with each payload transmission resource. The specified value range may also be preset or may also be determined according to a code rate or an MCS used by the payload transmission.

In one example, if the determination results of the first manner and the second manner are yes, the UE determines that the content to be transmitted is the msgA. The msgA includes the preamble to be used and the payload. That is, the UE performs the random access according to the 2-step RACH. If the determination results of the first manner and the second manner are no, the UE determines that the content to be transmitted is the preamble to be used. That is, the UE merely sends the preamble and performs the random access according to the 4-step RACH.

It can be seen form the first manner and the second manner, a preamble of which the determination results are yes can be used for the 2-step RACH. If other preambles are used, even if the UE supports the function of the 2-step RACH, the UE also performs the random access according to the 4-step RACH.

(3) The UE acquires a third preamble set according to the association relationship between the preamble transmission resource and the payload transmission resource. If the preamble to be used is included in the third preamble set, it is considered that the preamble to be used satisfies the first preset rule. For example, the UE determines that the content to be transmitted is the msgA. If the preamble to be used is not included in the third preamble set, it is considered that the preamble to be used does not satisfy the first preset rule. For example, the UE determines that the content to be transmitted is the preamble to be used.

In the third manner, the UE acquires the third preamble set according to the association relationship between the preamble transmission resource and the payload transmission resource that including the UE obtains a preamble transmission resource associated with each payload transmission resource and available preambles according to the association relationship between the preamble transmission resource and the payload transmission resource, and specified preambles in the available preambles are used as preambles in the third preamble set to obtain the third preamble set. For example, similar to the first manner, a remainder of the index of the available preambles to the first specified value may be taken to obtain a preamble index with the remainder being the second specified value, and these available preambles are used as preambles in the third preamble set.

It can be seen from the third manner, the preambles in the third preamble set may be used for the 2-step RACH, and if other preambles are used, even if the UE supports the function of the 2-step RACH, the UE also performs the random access according to the 4-step RACH.

(4) The UE determines that a payload transmission resource associated with a preamble transmission resource to be used is available according to the association relationship between the preamble transmission resource and the payload transmission resource. If the payload transmission resource associated with the preamble transmission resource to be used is available, it is considered that the preamble to be used satisfies the first preset rule. For example, the UE determines that the content to be transmitted is the msgA. If the payload transmission resource associated with the preamble transmission resource to be used is not available, it is considered that the preamble to be used does not satisfy the first preset rule. For example, the UE determines that the content to be transmitted is the preamble to be used, or the UE does not transmit.

The preamble transmission resource to be used is used for transmitting the preamble to be used.

In this manner, determining that the payload transmission resource associated with the preamble transmission resource to be used is available according to the association relationship between the preamble transmission resource and the payload transmission resource may be implemented in combination with information on whether the payload transmission resource is available.

According to this manner, when the payload transmission resource associated with the preamble transmission resource to be used is available, the UE may perform the 2-step RACH, and if the payload transmission resource associated with the preamble transmission resource to be used is not available, even if the UE supports a function of the 2-step RACH, the UE also performs the random access according to the 4-step RACH or abandons this access attempt.

In this embodiment, the method further includes a step described below.

In step S604, content to be transmitted is transmitted.

Specifically, if the content to be transmitted is the msgA, the preamble may be sent through a PRACH, the payload may be sent through a PUSCH, or the msgA may be sent through a PUSCH. If the content to be transmitted is a preamble, the preamble may be sent through the PRACH.

In this embodiment, the association relationship between the preamble transmission resource and the payload transmission resource may be broadcasted by the system, or pre-configured by the system or semi-statically configured by the system; or the association relationship between the preamble transmission resource and the payload transmission resource may also be acquired according to the number of preamble transmission resources, the number of payload transmission resources and a preset rule, or according to an association relationship between a synchronization signal block (SSB) and the preamble transmission resource and the association relationship between the SSB and the payload transmission resource.

The random access method of this embodiment can determine that the content to be transmitted is the msgA or the preamble according to the association relationship among the preamble to be used, the preamble transmission resource and the payload transmission resource. The method may control whether the UE uses the 2-step RACH according to the PUSCH collision in the 2-step RACH, thereby the collision of the payload transmitted on the PUSCH can be reduced, the transmission resource waste problem caused by the transmission failure of the PUSCH can be reduced, the transmission performance of the payload and the access efficiency of the system and the transmission performance of the system can be improved.

When the number of payload transmission resource are small and the number of preamble transmission resources associated with each payload transmission resource are large, the number of UEs using a same PUSCH to send the payload may be large, and there will be serious PUSCH collision, thereby affecting the payload transmission performance, and causing many UES to fall back from the 2-step RACH to the 4-step RACH, and then causing waste of transmission resources, affecting the access efficiency of the system and the transmission performance of the system. According to the method of this embodiment, whether the UE uses the 2-step RACH may be controlled, that is, the UE is controlled to send the msgA or the preamble, so that the PUSCH collision can be reduced, the payload transmission performance can be improved, many UEs can be prevented from falling back, the waste of transmission resources can be avoided, and the access efficiency of the system and the transmission performance of the system can be improved.

Implementation Mode 4

Figure 11:
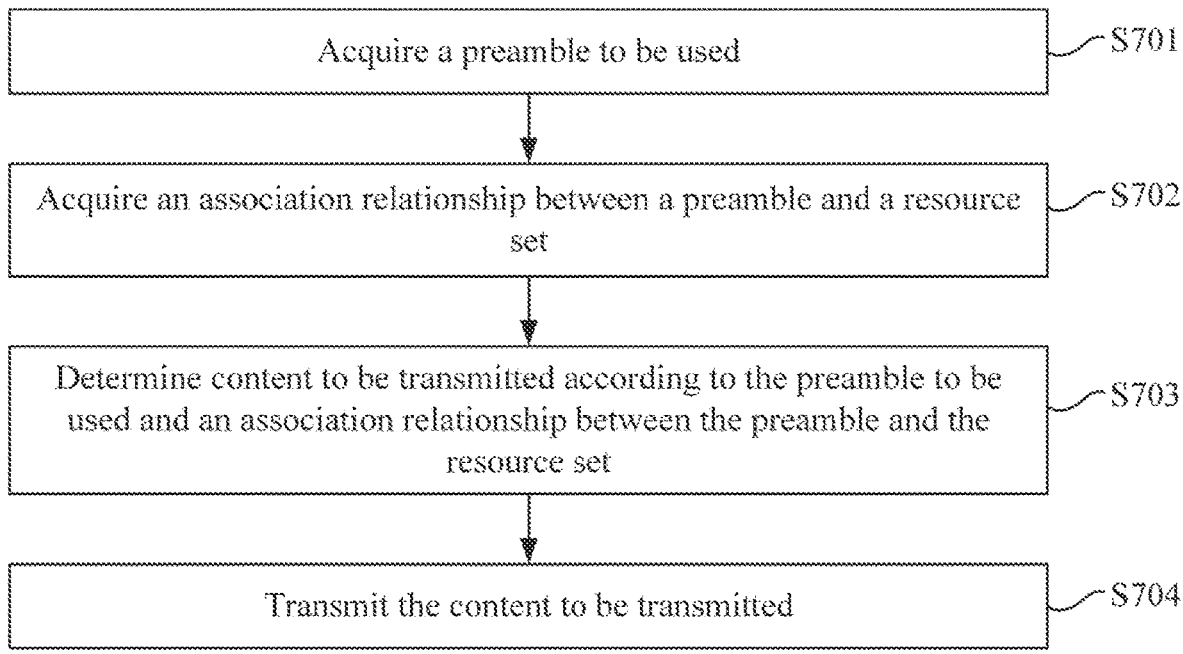
FIG. 11 is a flowchart of a random access method according to another embodiment of the present application.

The present embodiment provides a random access method applied to a transmitter, including but not limited to a terminal or a user equipment (UE). FIG. 11 is a flowchart of a random access method according to another embodiment of the present application. As shown in FIG. 11, the method includes steps described below.

In step S701, a preamble to be used is acquired.

Specifically, the UE acquires the preamble to be used through random selection or the UE acquires the preamble to be used according to the system configuration.

In step S702, an association relationship between a preamble and a resource set is acquired.

The resource set includes a specified payload transmission resource and a specified DMRS.

The association relationship between the preamble and the resource set includes an association relation between all preambles and the resource set, or an association relationship between a part of preambles and the resource set.

The payload transmission resource is a transmission resource used for transmitting the payload.

The payload is a payload in a msgA in 2-step RACH; or the payload is used for carrying data information.

The payload transmission resource includes a PUSCH or a PUSCH occasion or a payload occasion.

All preambles include all preambles being able to be used for the 2-step RACH, or all preambles in a specified preamble set, or all available preambles.

The part of preambles include a part of preambles in the preambles being able to be used for the 2-step RACH, or a part of preambles in the specified preamble set, or a part of preambles of all available preambles.

In step S703, content to be transmitted is determined according to the preamble to be used and an association relationship between the preamble and the resource set. Specifically, the UE determines that whether the preamble to be used satisfies the first preset rule according to the association relationship between the preamble and the resource set. If the preamble to be used satisfies the first preset rule, the UE determines that the content to be transmitted is a first message. The first message is the msgA in the 2-step RACH, where the msgA includes the preamble to be used and the payload, or the first message includes the payload. If the preamble to be used does not satisfy the first preset rule, the UE determines that the content to be transmitted is the preamble to be used, or the UE does not transmit.

In this step, the UE determines that whether the preamble to be used satisfies the first preset rule according to the association relationship between the preamble and the resource set, which includes at least one of the following manners.

(1) The UE determines that whether the preamble to be used belongs to one of specified preambles in preambles associated with one resource set according to the association relationship between the preamble and the resource set. If the preamble to be used belongs to the one of specified preambles in the preambles associated with the one resource set, it is considered that the preamble to be used satisfies the first preset rule. For example, the UE determines that the content to be transmitted is the msgA, where the msgA includes the preamble to be used and the payload. That is, the UE performs the random access according to the 2-step RACH. If the preamble to be used does not belong to the one of specified preambles in the preambles associated with the one resource set, it is considered that the preamble to be used does not satisfy the first preset rule. For example, the UE determines that the content to be transmitted is the preamble to be used. That is, the UE merely sends the preamble and performs the random access according to the 4-step RACH.

In this manner, there are multiple methods to determine that whether the preamble to be used belongs to the one of specified preambles in the preambles associated with the one resource set. For example, the UE may acquire S preambles associated with one resource set according to the association relationship between the preamble and the resource set. If the preamble to be used is one of T preambles in the S preambles, it is considered that the preamble to be used belongs to one of the specified preambles in the preambles associated with one resource set.

In this manner, for the S preambles associated with the one resource set, the T preambles in the S preambles may be used for the 2-step RACH, and if other preambles are used, even if the UE supports the function of the 2-step RACH, the UE also performs the random access according to the 4-step RACH.

(2) The UE acquires a fourth preamble set according to the association relationship between the preamble and the resource set, and if the preamble to be used is included in the fourth preamble set, it is considered that the preamble to be used satisfies the first preset rule. For example, the UE determines that the content to be transmitted is the msgA. If the preamble to be used is not included in the fourth preamble set, it is considered that the preamble to be used does not satisfy the first preset rule. For example, the UE determines that the content to be transmitted is the preamble to be used.

In this manner, the UE acquires the fourth preamble set according to the association relationship between the preamble and the resource set that including the UE acquires the T preambles in the S preambles associated with the each resource set in the specified resource set according to the association relationship between the preamble and the resource set, and the T preambles are used as preambles in the fourth preamble set to finally obtain the fourth preamble set.

The specified resource set here may be all available resource sets or a part of available resource sets. For example, when there are multiple groups of resource sets, the specified resource set may be one group of multiple groups of resource sets.

In this manner, preambles in the fourth preamble set may be used for the 2-step RACH, and if other preambles are used, even if the UE supports the function of the 2-step RACH, the UE also performs the random access according to the 4-step RACH.

(3) The UE determines that whether the preamble to be used has an association relationship with at least one resource set according to the association relationship between the preamble and the resource set. If the preamble to be used has the association relationship with the at least one payload transmission resource, it is considered that the preamble to be used satisfies the first preset rule. For example, the UE determines that the content to be transmitted is the msgA. If the preamble to be used has not the association relationship with at least one resource set, it is considered that the preamble to be used does not satisfy the first preset rule. For example, the UE determines that the content to be transmitted is the preamble to be used.

(4) The UE determined that whether a resource set associated with the preamble to be used is available according to the association relationship between the preamble and the resource set. If the resource set associated with the preamble to be used is available, it is considered that the preamble to be used satisfies the first preset rule. For example, the UE determines that the content to be transmitted is the msgA. If the resource set associated with the preamble to be used is not available, it is considered that the preamble to be used does not satisfy the first preset rule. For example, the UE determines that the content to be transmitted is the preamble to be used.

In this manner, the UE determines that whether the resource set associated with the preamble to be used is available according to the association relationship between the preamble and the resource set, which may be implemented in combination with information on whether the resource set is available.

According to this manner, when the resource set associated with the preamble to be used is available, the UE may perform the 2-step RACH, and if the resource set associated with the preamble to be used is not available, even if the UE supports the function of the 2-step RACH, the UE also performs the random access according to the 4-step RACH or abandons this access attempt.

In the above first manner, second manner and fourth manner, the association relationship between the preamble and the resource may be an association relation between all preambles and the resource set, or may also be an association relationship between a part of preambles and the resource set.

In the above third manner, the association relationship between the preamble and the resource set may specifically be the association relationship between the part of preambles and the resource set. The UE determines that whether the preamble to be used has the association relationship with at least one resource set according to the association relationship between the part of preambles and the DMRS, that is, it is determined that preamble to be used is one of the part of preambles. It can be seen that in this manner, the part of preambles may be used for the 2-step RACH, and if other preambles are used, even if the UE supports the function of the 2-step RACH, the UE also performs the random access according to the 4-step RACH.

It is to be noted that the number of preambles associated with each resource set may be the same or may be different.

In the above description, S is an integer, T is an integer, and T is less than or equal to S. A value of T may be determined according to a value of S or according to the number of preambles and the number of resource sets or according to the code rate or the MCS used by the payload transmission. The code rate or MCS used by the payload transmission is related to the size of payload and the number of the payload transmission resource. For example, when the code rate or the MCS of the payload transmission is low, a value of T may be large.

Specifically, the above T preambles include T preambles which are obtained at specified intervals with a specified preamble as a starting point among the S preambles. For example, the T preambles are the first T preambles of the S preambles, or the last T preambles of the S preambles, or intermediate T preambles of the S preambles, or the first T preamble with odd indexes of the S preambles, or the first T preambles with even indexes of the S preambles.

In this embodiment, the method further includes a step described below.

In step S704, content to be transmitted is transmitted.

Specifically, if the content to be transmitted is the msgA, the preamble may be sent through a PRACH, the payload may be sent through a PUSCH, or the msgA may be sent through a PUSCH. If the content to be transmitted is a preamble, the preamble may be sent through the PRACH.

In this embodiment, the association relationship between the preamble and the resource set may be broadcasted by the system or pre-configured by the system or semi-statically configured by the system, or the association relationship between the preamble and the resource set may also be acquired according to the association relationship between the preamble and the DMRS, or the association relationship between the preamble and the payload transmission resource, or the association relationship between the preamble transmission resource and the payload transmission resource.

The preamble transmission resource includes the PRACH or a PRACH occasion or an RACH occasion. The payload transmission resource includes the PUSCH or a PUSCH occasion or a payload occasion.

The random access method of this embodiment can determine the content to be transmitted is the msgA or the preamble according to the association relationship between the preamble to be used, the preamble and the resource set. The method may control whether the UE uses the 2-step RACH according to the PUSCH collision in the 2-step RACH, thereby the collision of the payload transmitted on the PUSCH can be reduced, the waste of the transmission resource caused by the transmission failure of the PUSCH can be reduced, the transmission performance of the payload and the access efficiency of the system and the transmission performance of the system can be improved.

When the number of resource sets is small and the number of preambles associated with each resource set is large, the number of UEs using a same PUSCH to send the payload may be large, and there will be serious PUSCH collision, thereby affecting the payload transmission performance. Therefore, many UEs are caused to fall back from the 2-step RACH to the 4-step RACH, thus causing waste of transmission resources and affecting access efficiency of the system and the transmission performance of the system. According to the method of this embodiment, whether the UE uses the 2-step RACH may be controlled, that is, the UE is controlled to send the msgA or the preamble, so that the PUSCH collision can be reduced, the payload transmission performance can be improved, many UEs can be prevented from falling back, the waste of transmission resources can be avoided, and the access efficiency of the system and the transmission performance of the system can be improved.

In one example, each resource set includes one payload transmission resource and one DMRS, and only one of the S preambles associated with the each resource set in the specified resource sets can be allowed for the 2-step RACH, so that DMRS collisions can be avoided or the PUSCH collisions can be controlled.

Implementation Mode 5

In this embodiment, it is assumed that one cell includes multiple UEs. In the multiple UEs, some UEs are far away from a base station or located at an edge of the cell, and the signal quality is poor; and some UEs are close to the base station or located at a center of the cell, and the signal quality is better.

A UE with better signal quality may be considered as a UE that can use 2-step RACH, while a UE with poor signal quality can use 4-step RACH.

For the UE capable of using the 2-step RACH, that is, the UE with better signal quality, random access may be further performed according to the random access method described in the above embodiment, including: acquiring a preamble to be used, acquiring first information, and determining content to be transmitted according to the preamble to be used and the first information.

The first information includes an association relationship between a preamble and a DMRS, or an association relationship between a preamble and a payload transmission resource, or an association relationship between a preamble transmission resource and a payload transmission resource, or an association relationship among a preamble and a payload transmission resource and a DMRS, or a preamble set.

The first information may further include indication information for indicating transmission content, where the transmission content includes the preamble to be used and a payload, or the payload, or the preamble to be used, or no content is transmitted.

If the UE determines that the content to be transmitted is a msgA, and the msgA includes the preamble to be used and the payload, the UE performs the random access according to the 2-step RACH. If the UE determines that the content to be transmitted is the preamble to be used, the UE performs the random access according to 4-step RACH. That is, for the UEs capable of using the 2-step RACH, the random access method described in the above embodiment can control whether these UEs really use the 2-step RACH. In order to mitigate the influence of PUSCH collision, some UEs capable of using the 2-step RACH will perform the random access according to the 4-step RACH.

Implementation Mode 6

In this embodiment, it is assumed that a preamble in a preamble set A is used for 4-step RACH and a preamble in a preamble set B is used for 2-step RACH. A UE that may use the preamble in the preamble set B is a UE that supports the 2-step RACH.

If the UE merely supports the 4-step RACH or if the UE selects the preamble in the preamble set A, the UE performs random access according to 4-step RACH process.

If the UE supports the 2-step RACH or if the UE selects the preamble in the preamble set B, the UE may further perform the random access according to the random access method described in the above embodiment, including: acquiring a preamble to be used, acquiring first information, and determining content to be transmitted according to the preamble to be used and the first information.

The first information includes an association relationship between a preamble and a DMRS, or an association relationship between a preamble and a payload transmission resource, or an association relationship between a preamble transmission resource and a payload transmission resource, or an association relationship among a preamble and a payload transmission resource and a DMRS, or a preamble set.

The first information may further include indication information for indicating transmission content, where the transmission content includes the preamble to be used and a payload, or the payload, or the preamble to be used, or no content is transmitted.

The preamble to be used is the preamble in the preamble set B.

For the association relationship between the preamble and the DMRS, the association relationship between the preamble and the payload transmission resource, the association relationship between the preamble transmission resource and the payload transmission resource, the association relationship among the preamble, the payload transmission resource and the DMRS, or the preamble set, the preamble mentioned here is also the preamble in the preamble set B.

In this embodiment, if the UE determines that the content to be transmitted is a msgA, and the msgA includes the preamble to be used and the payload, the UE performs the random access according to the 2-step RACH. If the UE determines that the content to be transmitted is the preamble to be used, the UE performs the random access according to 4-step RACH. That is, for the UEs supporting the 2-step RACH, the random access method described in the above embodiment can control whether these UEs really use the 2-step RACH. In order to mitigate the influence of PUSCH collision, some UEs supporting the 2-step RACH will perform the random access according to the 4-step RACH.

Implementation Mode 7

A method is provided by this embodiment and may be applied to a transmitter including but not limited to a terminal and a user equipment (UE). Specifically, the UE performs transmission according to the transmission method described in the above embodiment, including: acquiring a first index, acquiring first information, and determining content to be transmitted according to the first index and the first information.

After the content to be transmitted is determined, the UE may transmit the content to be transmitted.

The first index is a logical index without specific physical meaning. The first index may also be the index obtained according to the specified information, and the specified information includes identification information, etc. The first index may be acquired by random generation or random selection, or according to system configuration.

The first information includes an association relationship between an index and a DMRS, or an association relationship between an index and a payload transmission resource, or an association relationship among an index, a payload transmission resource and a DMRS, or an index set.

Determining the content to be transmitted according to the first index and the first information includes determining that whether the first index satisfies a first preset rule according to the first information. If the first index satisfies the first preset rule, the UE determines that the content to be transmitted includes a payload. If the first index does not satisfy the first preset rule, the UE determines that the UE will not transmit.

According to the transmission method of this embodiment, whether the payload is transmitted can be determined according to the first index and the first information, and the collision of the payload transmission can be controlled or mitigated, thereby improving the payload transmission performance and the transmission performance of the system.

Application Example 1

An application example is provided based on the implementation mode 1. In this application example, it is assumed that there are 64 preambles with indexes 0, 1, . . . , 63. The 64 preambles may be used for 2-step RACH.

In this application example, a UE acquires a preamble to be used, and it is assumed that the preamble to be used is a preamble 1.

Figure 12:
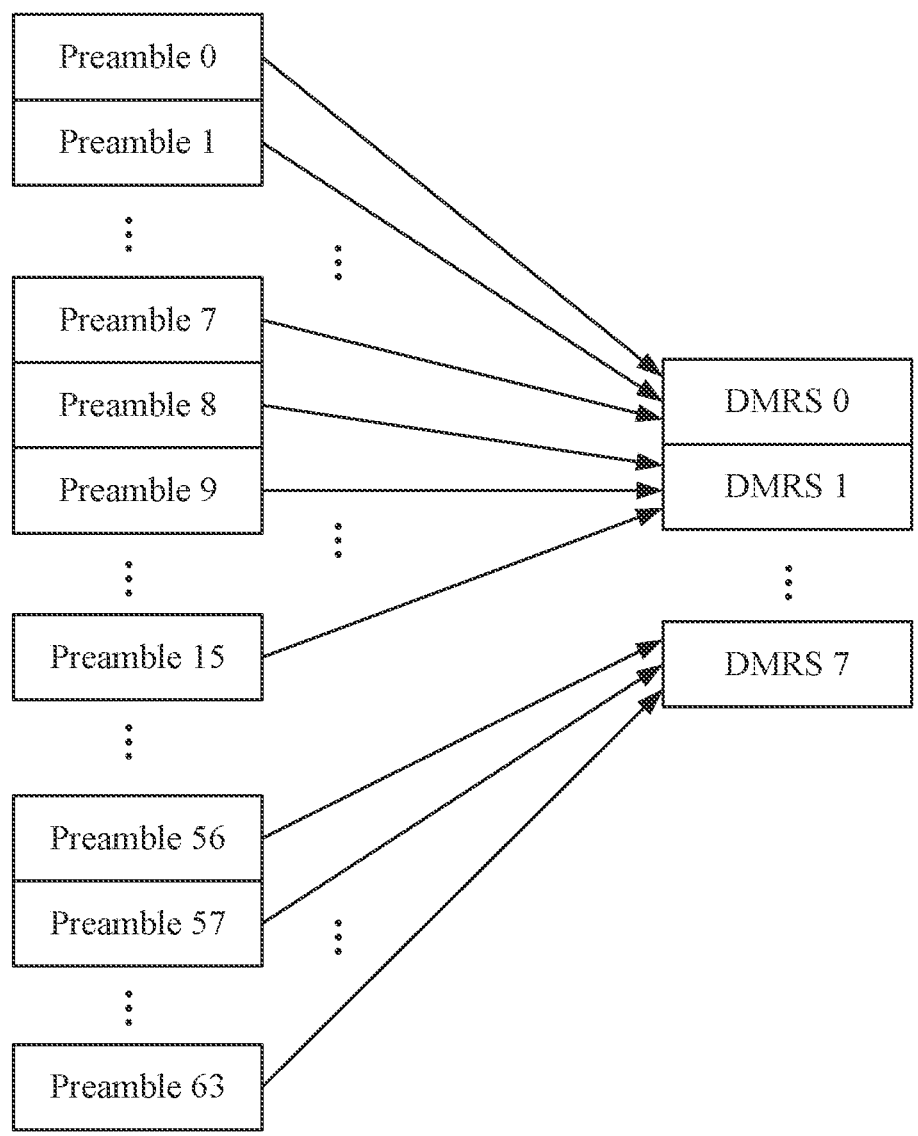
FIG. 12 is a schematic diagram of an application example of a random access method according to another embodiment of the present application.

The UE further acquires the association relationship between the preamble and the DMRS, as shown in FIG. 12, in this association relationship, there are 8 DMRSs with indexes 0, 1 . . . , 7, and every 8 preambles are associated with one DMRS of the 8 DMRSs. That is, there is an association between all preambles and the DMRSs.

The UE determines content to be transmitted according to the preamble to be used and the association relationship between the preamble and the DMRS. Specifically, the UE determines that whether the preamble to be used satisfies the first preset rule according to the association relationship between the preamble and the DMRS. If the preamble to be used satisfies the first preset rule, the UE determines that the content to be transmitted is a msgA. The msgA includes the preamble to be used and the payload, or the msgA includes a payload. If the preamble to be used does not satisfy the first preset rule, the UE determines that the content to be transmitted is the preamble to be used.

The UE determines that whether the preamble to be used satisfies the first preset rule according to the association relationship between the preamble and the DMRS, including the following manners.

(1) Manner one: the UE determines that whether the preamble to be used belongs to one of specified preambles in preambles associated with one DMRS according to the association relationship between the preamble and the DMRS. If the preamble to be used belongs to the one of specified preambles in the preambles associated with the one DMRS, the preamble to be used satisfies the first preset rule, and the UE determines that the content to be transmitted is the msgA. If the preamble to be used does not belong to the one of specified preambles in the preambles associated with the one DMRS, the preamble to be used does not satisfy the first preset rule, and the UE determines that the content to be transmitted is the preamble to be used.

It is assumed that the first preset rule is one of first two preambles in the preambles associated with one DMRS, and the preamble 1 belongs to one of the first two preambles among the 8 preambles associated with a DMRS 0, that is, the preamble 1 satisfies the first preset rule, therefore, the UE determines that the content to be transmitted is the msgA; or it is assumed that the first preset rule is a first preamble in the preambles associated with one DMRS, and the preamble 1 is not the first preamble in the 8 preambles associated with the DMRS 0, that is, the preamble 1 does not satisfy the first preset rule, therefore, the UE determines that the content to be transmitted is the preamble to be used, that is, the preamble 1.

(2) Manner two: the UE acquires a first preamble set according to the association relationship between the preamble and the DMRS, and if the preamble to be used is included in the first preamble set, the preamble to be used satisfies the first preset rule. The UE determines that the content to be transmitted is the msgA. If the preamble to be used is not included in the first preamble set, the preamble to be used does not satisfy the first preset rule. The UE determines that the content to be transmitted is the preamble to be used.

For example, the UE acquires first two preambles in the 8 preambles associated with each DMRS according to the association relationship between the preamble and the DMRS, and the first two preambles are used as preambles in the first preamble set to finally obtain the first preamble set, that is, (preamble 0, preamble 1, preamble 8, preamble 9, . . . , preamble 56, preamble 57). It can be seen that the preamble 1 is included in the first preamble set, so that the UE determines that the content to be transmitted is the msgA.

For another example, the UE acquires a first preamble in the 8 preambles associated with each DMRS according to the association relationship between the preamble and the DMRS, and the first preamble is used as a preamble in the first preamble set to finally obtain the first preamble set, that is, (preamble 0, preamble 8, . . . , preamble 56). It can be seen that the preamble 1 is not included in the first preamble set, so that the UE determines that the content to be transmitted is preamble to be used, that is, the preamble 1.

The UE sends the content to be transmitted.

Application Example 2

Another application example is provided based on the implementation mode 1. In this application example, it is assumed that there are 64 preambles with indexes 0, 1, . . . , 63, and the 64 preambles may be used for 2-step RACH.

In this application example, a UE acquires a preamble to be used, and it is assumed that the preamble to be used is a preamble 1.

Figure 13:
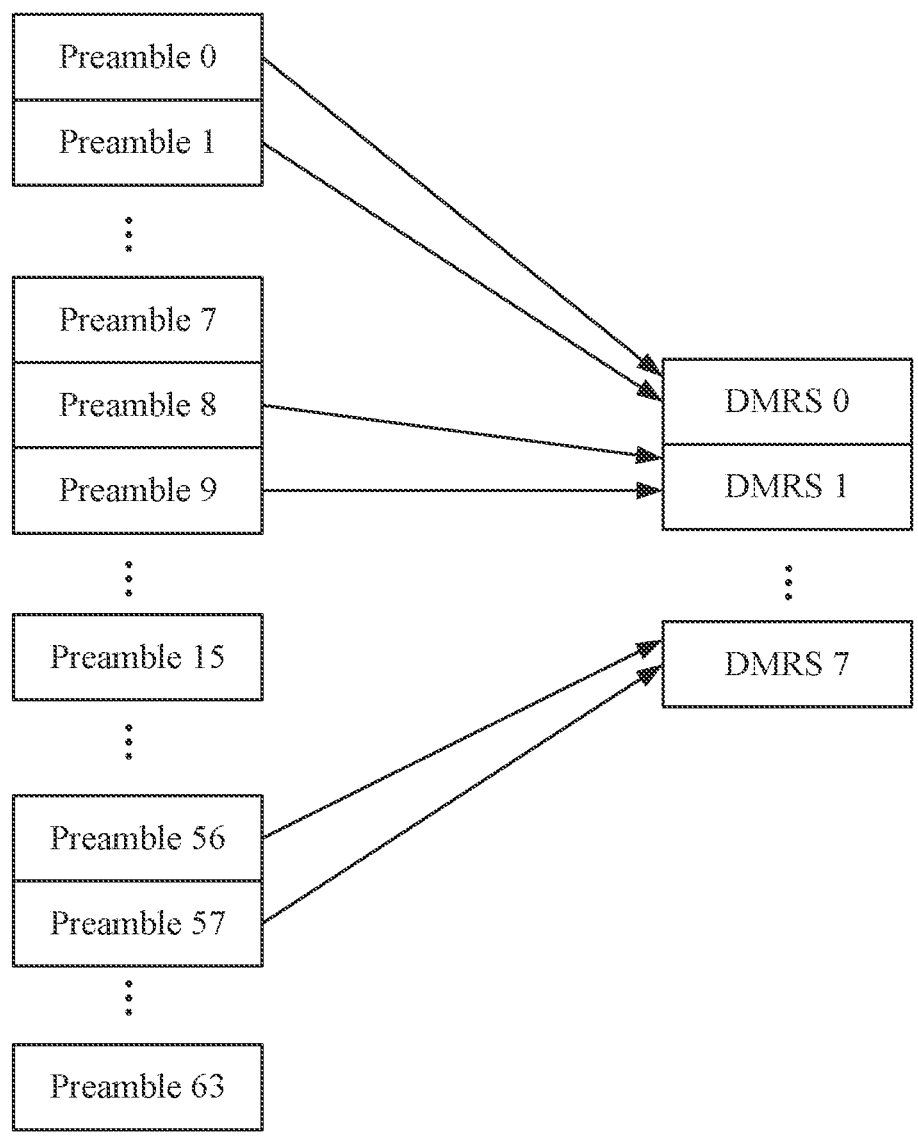
FIG. 13 is a schematic diagram of an application example of a random access method according to another embodiment of the present application.

The UE further acquires the association relationship between the preamble and the DMRS, as shown in FIG. 13, in this association relationship, there are 8 DMRSs with indexes 0, 1, . . . , 7, and two preambles are associated with one DMRS. For example, preamble 0 and preamble 1 are associated with DMRS 0, other preambles are similar. That is, in all preambles, there is an association between a part of preambles and the DMRS.

The UE determines the content to be transmitted according to the preamble to be used and the association relationship between the preamble and the DMRS. For example, the UE determines that whether the preamble to be used has an association relationship with at least one DMRS according to the association relationship between the preamble and the DMRS. If the preamble to be used has the association relationship with the at least one DMRS, the UE determines that the content to be transmitted is the msgA; or if the preamble to be used has not the association relationship with the at least one DMRS, the UE determines that the content to be transmitted is the preamble to be used.

According to the association relationship between the preamble and DMRS in this example, the preamble 1 is associated with the DMRS 0, so that the UE determines that the content to be transmitted is the msgA.

The UE sends the content to be transmitted.

In this application example, if it is assumed that the preamble to be used acquired by the UE is preamble 7, and the preamble 7 is not associated with any DMRS according to the association relationship between the preamble and the DMRS in this example, the UE determines that the content to be transmitted is the preamble to be used, that is, the preamble 7.

In this application example, the association relationship between the preamble and the DMRS may be semi-statically configured or semi-statically changed. For example, the association relationship between the preamble and the DMRS may further be an association relationship between one preamble and one DMRS, such as an association relationship between the preamble 0 and the DMRS 0, an association relationship between the preamble 8 and the DMRS 1, an association relationship between the preamble 16 and the DMRS 2, . . . , and an association relationship between the preamble 56 and the DMRS 7. Further, according to this application example, it is assumed that the preamble to be used acquired by the UE is the preamble 1, and the preamble 1 is not associated with any DMRS, the UE determines that the content to be transmitted is the preamble to be used, that is, the preamble 1.

Application Example 3

An application example is provided based on the implementation mode 2. In this application example, it is assumed that there are 64 preambles with indexes 0, 1, . . . , 63, and the 64 preambles may be used for 2-step RACH.

In this application example, a UE acquires a preamble to be used, and it is assumed that the preamble to be used is a preamble 1.

Figure 14:
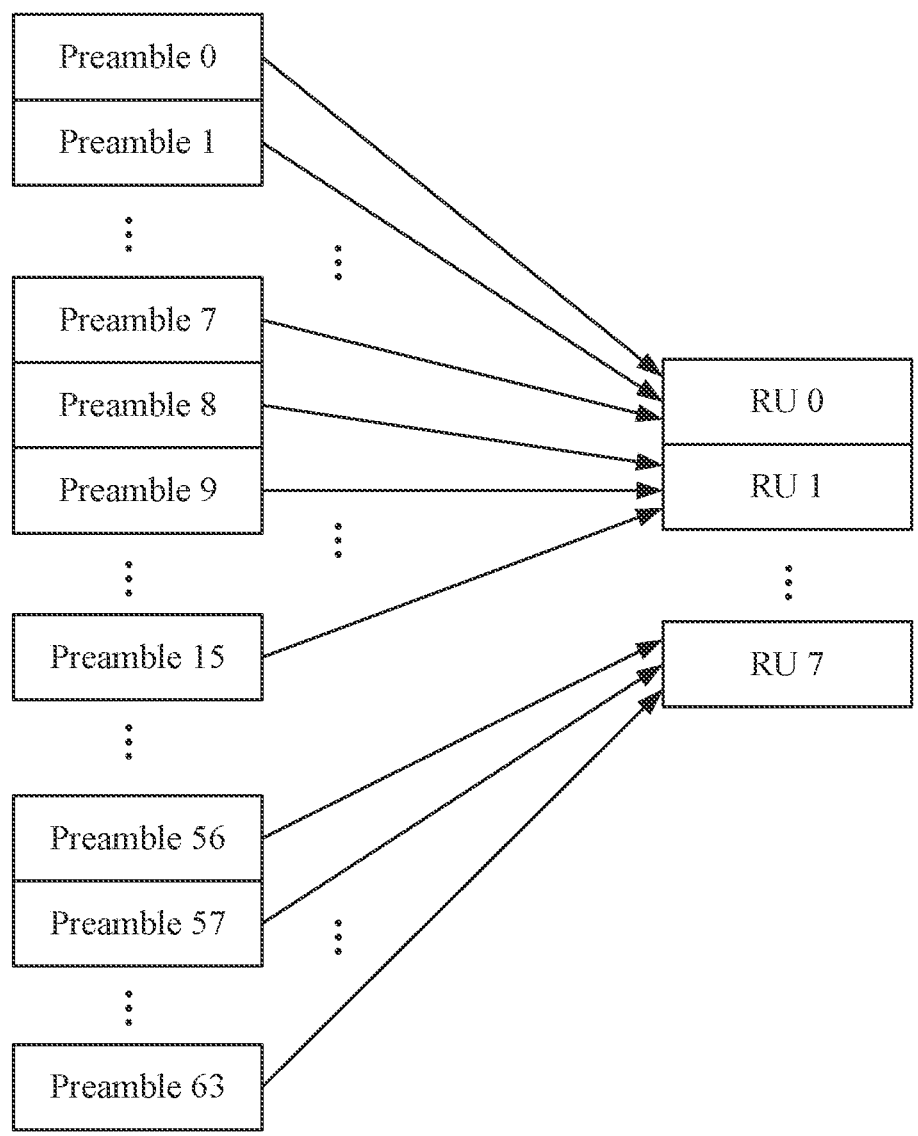
FIG. 14 is a schematic diagram of an application example of a random access method according to another embodiment of the present application.

The UE also acquires an association relationship between a preamble and a payload transmission resource, where the payload transmission resource is used for transmitting a payload. As shown in FIG. 14, it is assumed that there are 8 transmission resource units (RU) with indexes 0, 1, . . . , 7 that can be used for transmitting the payload, every 8 preambles are associated with one RU. That is, there is an association between all preambles and the payload transmission resource.

The UE determines content to be transmitted according to the preamble to be used and the association relationship between the preamble and the payload transmission resource. Specifically, the UE determines that whether the preamble to be used satisfies a first preset rule according to the association relationship between the preamble and the payload transmission resource. If the preamble to be used satisfies the first preset rule, the UE determines that the content to be transmitted is a msgA. The msgA includes the preamble to be used and the payload, or the msgA includes the payload. If the preamble to be used does not satisfy the first preset rule, the UE determines that the content to be transmitted is the preamble to be used.

The UE determines that whether the preamble to be used satisfies the first preset rule according to the association relationship between the preamble and the payload transmission resource, including the following manners.

(1) Manner one, the UE determines that whether the preamble to be used belongs to one of specified preambles in preambles associated with one payload transmission resource according to the association relationship between the preamble and the payload transmission resource. If the preamble to be used belongs to the one of specified preambles in the preambles associated with the one payload transmission resource, the preamble to be used satisfies the first preset rule, and the UE determines that the content to be transmitted is the msgA. If the preamble to be used does not belong to the one of specified preambles in the preambles associated with the one payload transmission resource, the preamble to be used does not satisfy the first preset rule, and the UE determines that the content to be transmitted is the preamble to be used.

For example, it is assumed that the first preset rule is one of first two preambles in preambles associated with one RU, preamble 1 belongs to one of first two preambles in 8 preambles associated with RU 0, that is, the preamble 1 satisfies the first preset rule, so that the UE determines that the content to be transmitted is the msgA.

For another example, it is assumed that the first preset rule is a first preamble in preambles associated with one RU, the preamble 1 does not belong to the first preamble in 8 preambles associated with RU 0, that is, the preamble 1 does not satisfy the first preset rule, so that the UE determines that the content to be transmitted is the preamble to be used, that is, the preamble 1.

(2) Manner two: the UE acquires a second preamble set according to the association relationship between the preamble and the payload transmission resource, and if the preamble to be used is included in the second preamble set, the preamble to be used satisfies the first preset rule. The UE determines that the content to be transmitted is the msgA. If the preamble to be used is not included in the second preamble set, the preamble to be used does not satisfy the first preset rule. The UE determines that the content to be transmitted is the preamble to be used.

For example, the UE acquires first two preambles in the 8 preambles associated with each RU according to the association relationship between the preamble and the payload transmission resource, and the first two preambles are used as preambles in the second preamble set to finally obtain the second preamble set, that is, {preamble 0, preamble 1, preamble 8, preamble 9 . . . . , preamble 56, preamble 57}. It can be seen that the preamble 1 is included in the second preamble set, so that the UE determines that the content to be transmitted is the msgA.

For another example, the UE acquires a first preamble in the 8 preambles associated with each RU according to the association relationship between the preamble and the payload transmission resource, and the first preamble is used as a preamble in the second preamble set to finally obtain the second preamble set, that is, {preamble 0, preamble 8, . . . , preamble 56}. It can be seen that the preamble 1 is not included in the second preamble set, so that the UE determines that the content to be transmitted is preamble to be used, that is, the preamble 1.

The UE sends the content to be transmitted.

Application Example 4

Another application example is provided based on the implementation mode 2. In this application example, it is assumed that there are 64 preambles with indexes 0, 1, . . . , 63, and the 64 preambles may be used for 2-step RACH.

In this application example, a UE acquires a preamble to be used, and it is assumed that the preamble to be used is a preamble 1.

Figure 15:
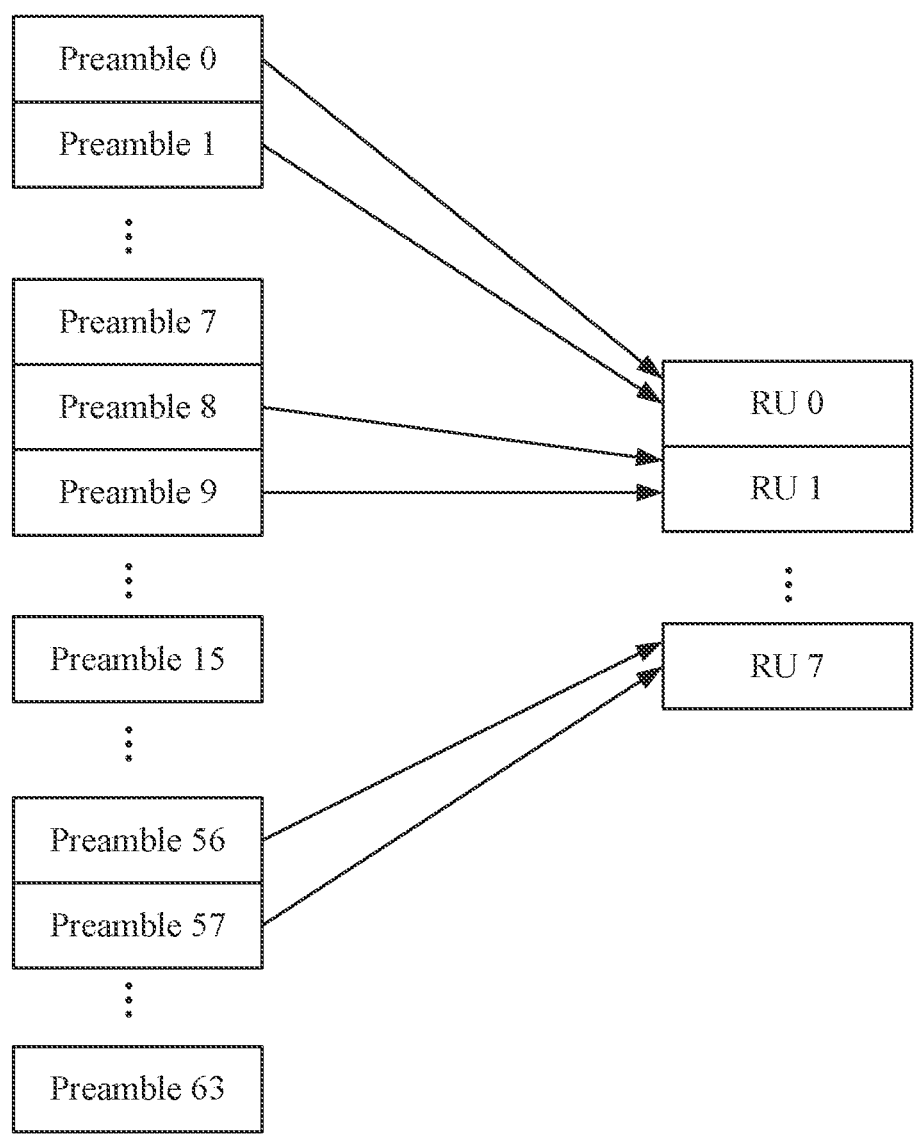
FIG. 15 is a schematic diagram of an application example of a random access method according to another embodiment of the present application.

The UE also acquires an association relationship between a preamble and a payload transmission resource. As shown in FIG. 15, it is assumed that there are 8 RUs with indexes 0, 1, . . . , 7 that can be used for transmitting a payload. Two preambles are associated with one RU, for example, preamble 0 and preamble 1 are associated with RU 0, and other preambles are similar. That is, there is an association between a part of all preambles and the payload transmission resource.

The UE determines content to be transmitted according to the preamble to be used and the association relationship between the preamble and the payload transmission resource.

For example, the UE determines that whether the preamble to be used has an association relationship with at least one payload transmission resource according to the association relationship between the preamble and the payload transmission resource. If the preamble to be used has the association relationship with the at least one payload transmission resource, the UE determines that the content to be transmitted is a msgA. If the preamble to be used has not the association relationship with the at least one payload transmission resource, the UE determines that the content to be transmitted is the preamble to be used.

The preamble 1 is associated with the RU 0 according to the association relationship between the preamble and the payload transmission resource in this example. So that the UE determines that the content to be transmitted is the msgA.

The UE sends the content to be transmitted.

In this application example, if it is assumed that the preamble to be used acquired by the UE is preamble 7, and the preamble 7 is not associated with any RU according to the association relationship between the preamble and the payload transmission resource in this example, the UE determines that the content to be transmitted is the preamble to be used, that is, the preamble 7.

In this application example, the association relationship between the preamble and the payload transmission resource may be semi-statically configured or semi-statically changed. For example, the association relationship between the preamble and the DMRS may further be an association relationship between one preamble and one RU, such as an association relationship between the preamble 0 and the RU 0, an association relationship between the preamble 8 and the RU 1, an association relationship between the preamble 16 and the RU 2, . . . , and an association relationship between the preamble 56 and the RU 7. Further, according to this application example, it is assumed that the preamble to be used acquired by the UE is the preamble 1, and the preamble 1 is not associated with any RU, the UE determines that the content to be transmitted is the preamble to be used, that is, the preamble 1.

Application Example 5

An application example is provided based on the implementation mode 3. In this application example, it is assumed that there are 64 preambles with indexes 0, 1, . . . , 63, and the 64 preambles may be used for 2-step RACH.

In this application example, a UE acquires a preamble to be used.

Figure 16:
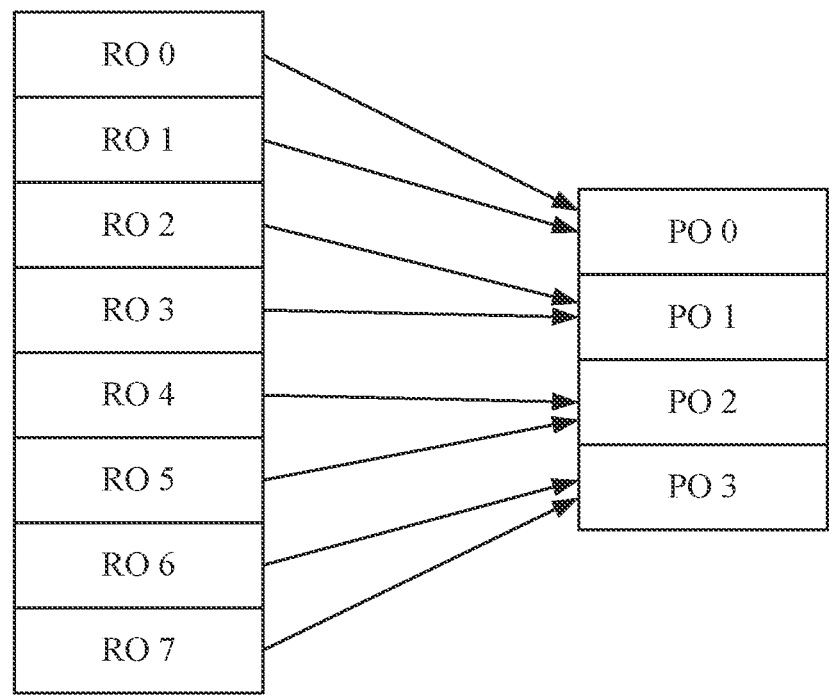
FIG. 16 is a schematic diagram of an application example of a random access method according to another embodiment of the present application.
Figure 17:
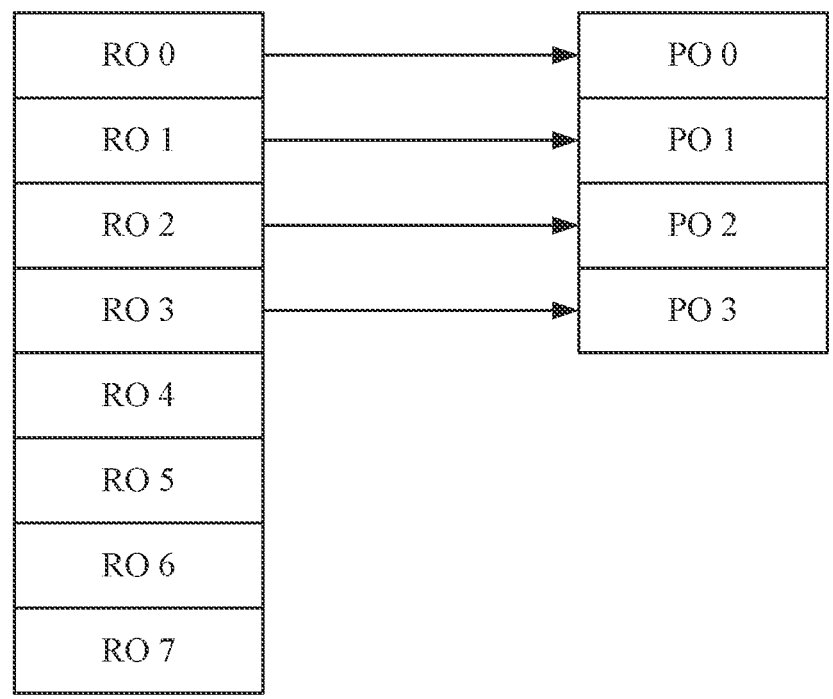
FIG. 17 is a schematic diagram of an application example of a random access method according to another embodiment of the present application.

The UE also acquires an association relationship between a preamble transmission resource and a payload transmission resource. As shown in FIG. 16, the preamble transmission resource includes 8 RACH occasions (RO) with indexes 0, 1, . . . , 7. The payload transmission resource includes 4 PUSCH occasions (PO) with indexes 0, 1, 2, 3. Every two ROs are associated with one PO. That is, the association relationship between the preamble transmission resource and the payload transmission resource is a many-to-one relationship.

The UE determines content to be transmitted according to the preamble to be used and the association relationship between the preamble transmission resource and the payload transmission resource. Specifically, the UE determines that whether the preamble to be used satisfies a first preset rule according to the association relationship between the preamble transmission resource and the payload transmission resource. If the preamble to be used satisfies the first preset rule, the UE determines that the content to be transmitted is a msgA. The msgA includes the preamble to be used and a payload, or the msgA includes a payload. If the preamble to be used does not satisfy the first preset rule, the UE determines that the content to be transmitted is the preamble to be used.

The UE determines that whether the preamble to be used satisfies the first preset rule according to the association relationship between the preamble transmission resource and the payload transmission resource, including the following manners.

(1) Manner one: the UE determines that whether a remainder of the preamble to be used to a first specified value is equal to a second specified value according to the association relationship between the preamble transmission resource and the payload transmission resource. If the remainder of the preamble to be used to the first specified value is equal to the second specified value, the preamble to be used satisfies the first preset rule. The UE determines that the content to be transmitted is the msgA. If the remainder of the preamble to be used to the first specified value is not equal to the second specified value, the preamble to be used does not satisfy the first preset rule, and the UE determines that the content to be transmitted is the preamble to be used.

For example, it is assumed that the first preset rule is a remainder Z of a preamble index to a specified value X. The specified value X is determined according to the association relationship between the preamble transmission resource and the payload transmission resource. For example, the number of preamble transmission resources associated with each payload transmission resource may be obtained to be 2 according to the association relationship between the preamble transmission resource and the payload transmission resource. Let X may be equal to a*2, where a represents an adjustment factor, here, if a=8, it can be obtained that X=16. The specified value X may also be preset and changed, for example, current preset X=16. The specified value X may also be determined according to a code rate or an MCS used by the payload transmission, for different code rates or MCSs, a value of X may be different. A value of Z may be determined according to the number of preamble transmission resources associated with one payload transmission resource. In this example, since there are two preamble transmission resources associated with one payload transmission resource, for the two preamble transmission resource, a value of Z may be 0 and 1. Further, it is determined that whether a remainder of an index of the preamble to be used to the specified value X is Z. If it is assumed that the index of the preamble to be used is 32 and that the preamble to be used will be transmitted through RO 0 associated with PO 0, it can be seen that the remainder of 32 to X=16 is Z=0, and it is considered that the preamble to be used satisfies the first preset rule. The UE determines that the content to be transmitted is the msgA. If it is assumed that the index of the preamble to be used is 5 and that the preamble to be used will be transmitted through RO 0 associated with PO 0, it can be seen that the remainder of 5 to X=16 is not equal to 0, and it is considered that the preamble to be used does not satisfy the first preset rule. The UE determines that the content to be transmitted is the preamble to be used, that is preamble 5.

(2) Manner two: the UE determines that whether a ratio of the number of preambles to be used to the number of preambles is located within a specified value range according to the association relationship between the preamble transmission resource and the payload transmission resource. If the ratio of the number of preambles to be used to the number of preambles is located within the specified value range, the preamble to be used satisfies the first preset rule, and the UE determines that the content to be transmitted is the msgA. If the ratio of the number of preambles to be used to the number of preambles is not located within the specified value range, the preamble to be used does not satisfy the first preset rule, and the UE determines that the content to be transmitted is the preamble to be used.

The specified value range may be determined according to the association relationship between the preamble transmission resource and the payload transmission resource. For example, the number of preamble transmission resources associated with each payload transmission resource may be obtained to be 2 according to the association relationship between the preamble transmission resource and the payload transmission resource. Let Y may be equal to b/2, where b represents an adjustment factor, here, if b=⅛, it can be obtained that Y=1/16. The specified value range is determined according to Y. Since there are two preamble transmission resources associated with one payload transmission resource, for the two preamble transmission resource, the specified value ranges may be 0~1/16 and 1/16~2/16 respectively. The specified value range may also be preset or may also be changed, for different preamble transmission resources, the specified value ranges may be different. The specified value range may also be determined according to a code rate or an MCS used by the payload transmission, for different code rates or MCSs, the specified value ranges may be different. Further, it is determined that whether the ratio of the index of the preamble to be used to the number of preambles is located within the specified value range. If it is assumed that the index of the preamble to be used is 2 and that the preamble to be used will be transmitted through RO 0 associated with PO 0, it can be seen that the ratio of 2 to 64 is located within 0~1/16, and it is considered that the preamble to be used satisfies the first preset rule. The UE determines that the content to be transmitted is the msgA. If it is assumed that the index of the preamble to be used is 8 and that the preamble to be used will be transmitted through RO 0 associated with PO 0, it can be seen that the ratio of 8 to 64 is not located within 0~1/16, and it is considered that the preamble to be used does not satisfy the first preset rule. The UE determines that the content to be transmitted is the preamble to be used, that is preamble 8.

(3) Manner three: the UE acquires a third preamble set according to the association relationship between the preamble transmission resource and the payload transmission resource. If the preamble to be used is included in the third preamble set, the preamble to be used satisfies the first preset rule, and the UE determines that the content to be transmitted is the msgA. If the preamble to be used is not included in the third preamble set, the preamble to be used does not satisfy the first preset rule, and the UE determines that the content to be transmitted is the preamble to be used.

For example, the UE may obtain that the number of preamble transmission resources associated with each payload transmission resource is 2 according to the association relationship between the preamble transmission resource and the payload transmission resource. It is assumed that 64 preambles are available on the each preamble transmission resource, specified preambles in the available preambles are used as preambles in the third index set, thus obtaining the third index set. For example, a remainder of the index of the available preambles to the specified value is taken to obtain a preamble index with the remainder being Z, and these available preambles are used as preambles in the third preamble set. There X=16. A value of Z may be determined according to the number of preamble transmission resources associated with one payload transmission resource. In this example, since there are two preamble transmission resources associated with one payload transmission resource, for the two preamble transmission resource, a value of Z may be 0 and 1. For the RO 0 associated with the PO 0, Z=0, and then the obtained third preamble set is {preamble 0, preamble 16, preamble 32, preamble 48}. Further, if it is assumed that the index of the preamble to be used is 32 and that the preamble to be used will be transmitted through RO 0 associated with PO 0, it can be seen that the preamble to be used is included in the third preamble set, and the UE determines that the content to be transmitted is the msgA. If it is assumed that the index of the preamble to be used is 5, and the preamble to be used is not included in the third preamble set, the UE determines that the content to be transmitted is preamble to be used, that is, the preamble 5.

For another example, preamble indexes of which ratio of the index of available preambles to the number of preambles is located within the specified value range are obtained, and these preambles are used as preambles in the third preamble set. The specified value range is determined according to a specified value Y. There let Y=1/16. Since there are two preamble transmission resources associated with one payload transmission resource, for the two preamble transmission resource, the specified value ranges may be 0~1/16 and 1/16~2/16 respectively. For the RO 0 associated with the PO 0, the specified value range may be [0, 1/16), and then the obtained third preamble set is {preamble 0, preamble 1, preamble 2, preamble 3}. Further, if it is assumed that the index of the preamble to be used is 2 and that the preamble to be used will be transmitted through RO 0, it can be seen that the preamble to be used is included in the third preamble set, and the UE determines that the content to be transmitted is the msgA. If it is assumed that the index of the preamble to be used is 8, and the preamble to be used is not included in the third preamble set, the UE determines that the content to be transmitted is preamble to be used, that is, the preamble 8.

The UE sends the content to be transmitted.

Application Example 6

An application example is provided based on the implementation mode 3. In this application example, it is assumed that there are 64 preambles with indexes 0, 1, . . . , 63, and the 64 preambles may be used for 2-step RACH.

In this application example, a UE acquires a preamble to be used.

The UE also acquires an association relationship between the preamble transmission resource and the payload transmission resource. As shown in FIG. 16, the preamble transmission resource includes 8 RACH occasions (RO) with indexes 0, 1, . . . , 7. The payload transmission resource includes 4 PUSCH occasions (PO) with indexes 0, 1, 2, 3, RO 0, RO 1, RO 2, RO 3 and PO 0, PO 1, PO 2, PO 3 are in one-to-one correspondence, and other ROs are not associated with any PO. RO 0, RO 1, RO 2 and RO 3 are preamble transmission resources that can be used for the 2-step RACH, and the other ROs are used for 4-step RACH.

The UE determines content to be transmitted according to the preamble to be used and the association relationship between the preamble transmission resource and the payload transmission resource. Specifically, the UE determines that whether the preamble to be used satisfies a first preset rule according to the association relationship between the preamble transmission resource and the payload transmission resource. If the preamble to be used satisfies the first preset rule, the UE determines that the content to be transmitted is a msgA. The msgA includes the preamble to be used and a payload, or the msgA includes a payload. If the preamble to be used does not satisfy the first preset rule, the UE determines that the content to be transmitted is the preamble to be used.

The UE determines that whether the preamble to be used satisfies the first preset rule according to the association relationship between the preamble transmission resource and the payload transmission resource, including the following manners.

(1) Manner one: the UE determines that whether a remainder of the preamble to be used to a first specified value is equal to a second specified value according to the association relationship between the preamble transmission resource and the payload transmission resource. If the remainder of the preamble to be used to the first specified value is equal to the second specified value, the preamble to be used satisfies the first preset rule, and the UE determines that the content to be transmitted is the msgA. If the remainder of the preamble to be used to the first specified value is equal to the second specified value, the preamble to be used does not satisfy the first preset rule, and the UE determines that the content to be transmitted is the preamble to be used.

For example, it is assumed that the first preset rule is a remainder Z of a preamble index to a specified value X, the specified value X may be determined according to the association relationship between the preamble transmission resource and the payload transmission resource. For example, the number of preamble transmission resources associated with each payload transmission resource may be obtained to be 1 according to the association relationship between the preamble transmission resource and the payload transmission resource. Let X may be equal to a*1, where a represents an adjustment factor, here, if a=16, it can be obtained that X=16. A value of Z may be determined according to the number of preamble transmission resources associated with one payload transmission resource. In this example, since there is one preamble transmission resource associated with one payload transmission resource, a value of Z may be 0. Further, it is determined that whether a remainder of an index of the preamble to be used to the specified value X is 0. If it is assumed that the index of the preamble to be used is 32, it can be seen that a remainder of 32 to X=16 is equal to 0, and it is considered that the preamble to be used satisfies the first preset rule, and the UE determines that the content to be transmitted is the msgA. If it is assumed that the index of the preamble to be used is 5, it can be seen that a remainder of 5 to X=16 is not equal to 0, and it is considered that the preamble to be used does not satisfy the first preset rule, then the UE determines that the content to be transmitted is the preamble to be used, that is, preamble 5.

(2) Manner two: the UE determines that whether a ratio of the number of preambles to be used to the number of preambles is located within a specified value range according to the association relationship between the preamble transmission resource and the payload transmission resource. If the ratio of the number of preambles to be used to the number of preambles is located within the specified value range, the preamble to be used satisfies the first preset rule, and the UE determines that the content to be transmitted is the msgA. If the ratio of the number of preambles to be used to the number of preambles is not located within the specified value range, the preamble to be used does not satisfy the first preset rule, and the UE determines that the content to be transmitted is the preamble to be used.

The specified value range may be determined according to the association relationship between the preamble transmission resource and the payload transmission resource. For example, the number of preamble transmission resources associated with each payload transmission resource may be obtained to be 1 according to the association relationship between the preamble transmission resource and the payload transmission resource. Let Y may be equal to b/1, where b represents an adjustment factor, here, if b=1/16, it can be obtained that Y=1/16. The specified value range is determined according to Y. Since there is one preamble transmission resource associated with one payload transmission resource, the specified value range may be 0~1/16. Further, it is determined that whether the ratio of the index of the preamble to be used to the number of preambles is located within the specified value range. If it is assumed that the index of the preamble to be used is 2, it can be seen that a ratio of 2 to 64 is located within 0~1/16, and it is considered that the preamble to be used satisfies the first preset rule, then the UE determines that the content to be transmitted is the msgA. If it is assumed that the index of the preamble to be used is 8, it can be seen that a ratio of 8 to 64 is not located within 0~1/16, and it is considered that the preamble to be used does not satisfy the first preset rule, then the UE determines that the content to be transmitted is the preamble to be used, that is, preamble 8.

(3) Manner three: the UE acquires a third preamble set according to the association relationship between the preamble transmission resource and the payload transmission resource. If the preamble to be used is included in the third preamble set, the preamble to be used satisfies the first preset rule, and the UE determines that the content to be transmitted is the msgA. If the preamble to be used is not included in the third preamble set, the preamble to be used does not satisfy the first preset rule, and the UE determines that the content to be transmitted is the preamble to be used.

For example, the UE may obtain that the number of preamble transmission resources associated with each payload transmission resource is 1 according to the association relationship between the preamble transmission resource and the payload transmission resource. It is assumed that 64 preambles are available on the each preamble transmission resource, specified preambles in the available preambles are used as preambles in the third index set, thus obtaining the third index set. For example, a remainder of the index of the available preambles to the specified value is taken to obtain a preamble index with the remainder being Z, and these available preambles are used as preambles in the third preamble set. There X=16. A value of Z may be determined according to the number of preamble transmission resources associated with one payload transmission resource. In this example, since there is one preamble transmission resource associated with one payload transmission resource, a value of Z may be 0. The obtained third preamble set is {preamble 0, preamble 16, preamble 32, preamble 48}. Further, if it is assumed that the index of the preamble to be used is 32, and the preamble to be used is included in the third preamble set, the UE determines that the content to be transmitted is the msgA. If it is assumed that the index of the preamble to be used is 5, and the preamble to be used is not included in the third preamble set, the UE determines that the content to be transmitted is preamble to be used, that is, the preamble 5.

Preamble indexes of which ratio of the index of available preambles to the number of preambles is located within the specified value range are obtained, and these preambles are used as preambles in the third preamble set, which is similar to the previous description and will not be repeated here.

The UE sends the content to be transmitted.

In this example, it can be seen that if an RO used by the UE is included in ROs 0~3, it is considered that the UE supports the 2-step RACH and determines that whether the random access is performed according to the 2-step RACH according this application example, that is, the UE determines that the content to be transmitted is the msgA or the preamble to be used. Otherwise, if an RO used by the UE is included in ROs 4~7, the UE performs the random access according to the 4-step RACH.

Application Example 7

An application example is provided based on the implementation mode 4. In this application example, it is assumed that there are 64 preambles with indexes 0, 1, . . . , 63, and the 64 preambles may be used for 2-step RACH.

In this application example, a UE acquires a preamble to be used, and it is assumed that the preamble to be used is a preamble 1.

Figure 18:
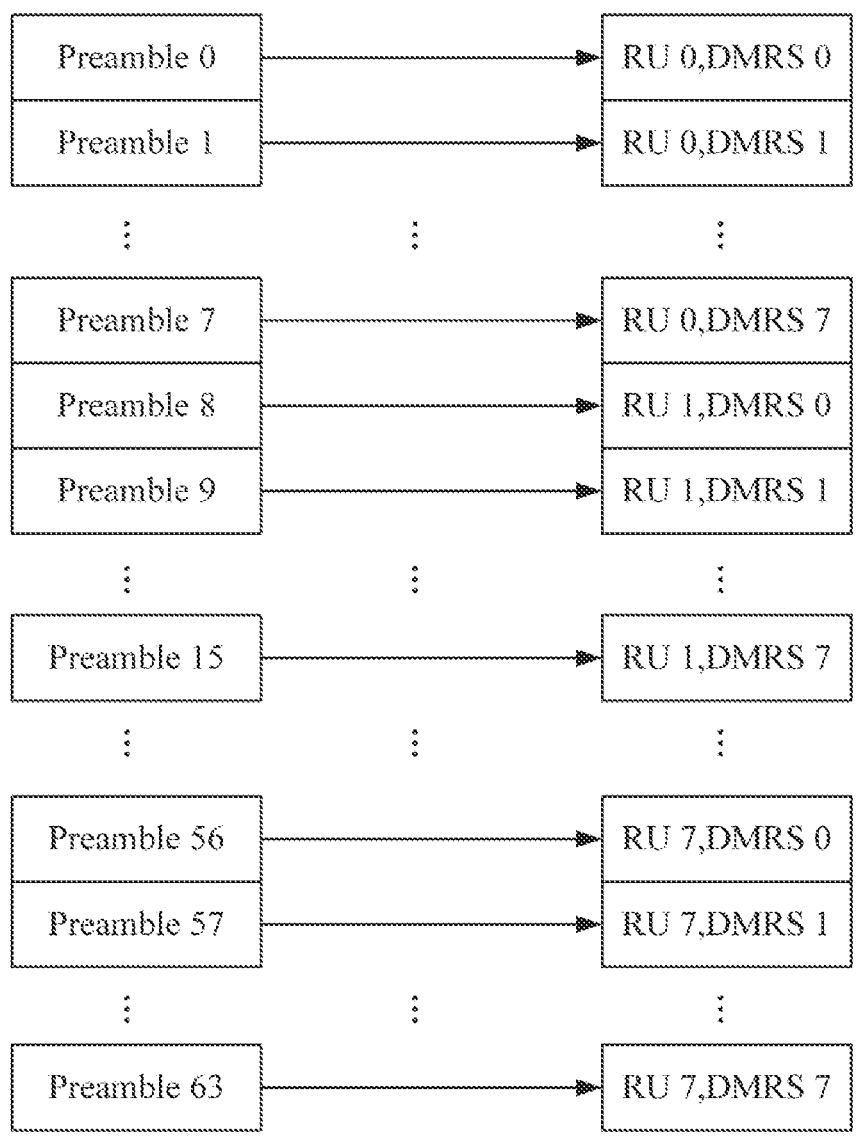
FIG. 18 is a schematic diagram of an application example of a random access method according to another embodiment of the present application.

The UE also acquires an association relationship between a preamble and a resource set, where the resource set includes a specified payload transmission resource and a specified DMRS, and the payload transmission resource is used for transmitting a payload. As shown in FIG. 18, it is assumed that there are 8 RUs with indexes 0, 1, . . . , 7 that can be used for transmitting a payload. There are 8 DMRSs with indexes 0, 1, . . . , 7 on each RU. Each preamble is associated with one resource set, and the one resource set includes one RU and one DMRS. It can be seen that there is an association between all preambles and the resource set.

The UE determines content to be transmitted according to a preamble to be used and an association relationship between the preamble and the resource set. Specifically, the UE determines that whether the preamble to be used satisfies a first preset rule according to the association relationship between the preamble and the resource set. If the preamble to be used satisfies the first preset rule, the UE determines that the content to be transmitted is a msgA. The msgA includes the preamble to be used and a payload, or the msgA includes a payload. If the preamble to be used does not satisfy the first preset rule, the UE determines that the content to be transmitted is the preamble to be used.

The UE determines that whether the preamble to be used satisfies the first preset rule according to the association relationship between the preamble and the resource set, including the following manners.

(1) Manner one: the UE determines that whether the preamble to be used belongs to one of specified preambles in preambles associated with one resource set according to the association relationship between the preamble and the resource set. If the preamble to be used belongs to the one of specified preambles in the preambles associated with the one resource set, the preamble to be used satisfies the first preset rule, and the UE determines that the content to be transmitted is the msgA. If the preamble to be used does not belong to the one of specified preambles in the preambles associated with the one resource set, the preamble to be used does not satisfy the first preset rule, and the UE determines that the content to be transmitted is the preamble to be used.

For example, it is assumed that the first preset rule is a first preamble in preambles associated with one resource set, in this example, each preamble is associated with one resource set, so that it can be considered that each preamble satisfies the first preset rule, and the UE determines that the content to be transmitted is the msgA.

(2) Manner two: the UE acquires a fourth preamble set according to the association relationship between the preamble and the resource set, and if the preamble to be used is included in the fourth preamble set, the preamble to be used satisfies the first preset rule, and the UE determines that the content to be transmitted is a msgA. If the preamble to be used is not included in the fourth preamble set, the preamble to be used does not satisfy the first preset rule, and the UE determines that the content to be transmitted is the preamble to be used.

For example, the UE acquires preambles associated with first two DMRSs on each RU according to the association relationship between the preamble and the resource set, and the preambles are used as preambles in the fourth preamble set to finally obtain the fourth preamble set, that is, {preamble 0, preamble 1, preamble 8, preamble 9, . . . , preamble 56, preamble 57}. It can be seen that the preamble 1 is included in the fourth preamble set, so that the UE determines that the content to be transmitted is the msgA.

For another example, the UE acquires preambles associated with a first DMRS on each RU according to the association relationship between the preamble and the resource set, and the preambles are used as preambles in the fourth preamble set to finally obtain the fourth preamble set, that is, {preamble 0, preamble 8, . . . , preamble 56}. It can be seen that the preamble 1 is not included in the fourth preamble set, so that the UE determines that the content to be transmitted is preamble to be used, that is, the preamble 1.

The UE sends the content to be transmitted.

In this application example, the association relationship between the preamble and the resource set may also be an association relationship between a part of preambles and the resource set, and the UE determines that whether the preamble to be used satisfies the first preset rule according to the association relationship between the preamble and the resource set, specifically the UE may determine that whether the preamble to be used has an association relationship with at least one resource set according to the association relationship between the preamble and the resource set. If the preamble to be used has the association relationship with the at least one resource set, it is considered that the preamble to be used satisfies the first preset rule, and the UE determines that the content to be transmitted is the msgA. If the preamble to be used has not the association relationship with the at least one resource set, it is considered that the preamble to be used does not satisfy the first preset rule, and the UE determines that the content to be transmitted is the preamble to be used.

Figure 19:
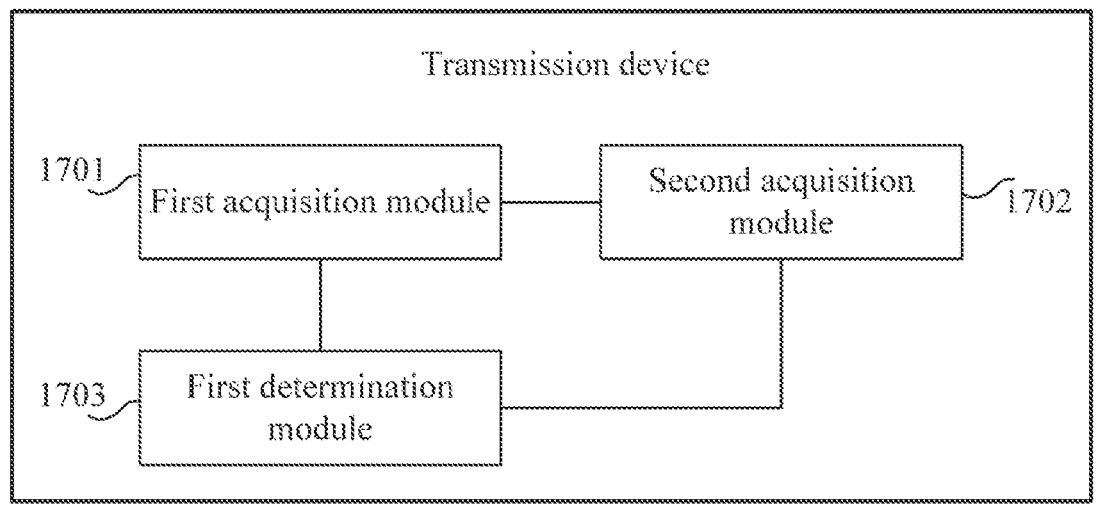
FIG. 19 is a structure diagram of a transmission device according to an embodiment of the present application.

FIG. 19 is a structure diagram of a transmission device according to an embodiment of the present application. As shown in FIG. 19, the transmission device may include a first acquisition module 1701, a second acquisition module 1702 and a first determination module 1703. The first acquisition module 1701 is configured to acquire a first index; the second acquisition module 1702 is configured to acquire first information; and the first determination module 1703 is configured to determine, in response to determining that the first index satisfies a first preset rule according to the first information, that content to be transmitted includes a first message.

In one embodiment, the first information includes an association relationship between an index and a DMRS. The first determination module is configured to determine that the first index satisfies the first preset rule according to the first information, including: determining that the first index belongs to one of specified indexes in indexes associated with one DMRS according to the association relationship between the index and the DMRS; or determining that the first index belongs to a first index set according to the association relationship between the index and the DMRS, where the first index set is acquired according to the association relationship between the index and the DMRS; or determining that the first index has an association relationship with at least one DMRS according to the association relationship between the index and the DMRS; or determining that a DMRS associated with the first index is available according to the association relationship between the index and the DMRS.

Acquiring the first index set according to the association relationship between the index and the DMRS includes acquiring N indexes in M indexes associated with each DMRS in specified DMRSs according to the association relationship between the index and the DMRS, and using the N indexes as indexes in the first index set to obtain the first index set, where M is an integer, N is an integer, and N is less than or equal to M.

In one embodiment, the first information includes an association relationship between an index and a payload transmission resource. The first determination module is configured to determine that the first index satisfies the first preset rule according to the first information, including: determining that the first index belongs to one of specified indexes in indexes associated with one payload transmission resource according to the association relationship between the index and the payload transmission resource; or determining that the first index belongs to a second index set according to the association relationship between the index and the payload transmission resource, where the second index set is acquired according to the association relationship between the index and the payload transmission resource; or determining that the first index has an association relationship with at least one payload transmission resource according to the association relationship between the index and the payload transmission resource; or determining that a payload transmission resource associated with the first index is available according to the association relationship between the index and the payload transmission resource.

Acquiring the second index set according to the association relationship between the index and the payload transmission resource includes acquiring Q indexes in P indexes associated with each payload transmission resource in specified payload transmission resources according to the association relationship between the index and the payload transmission resource, and using the Q indexes as indexes in the second index set to obtain the second index set, where P is an integer, Q is an integer, and Q is less than or equal to P.

In one embodiment, the first information includes an association relationship between a preamble transmission resource and a payload transmission resource. The first determination module is configured to determine that the first index satisfies the first preset rule according to the first information, including: determining that a remainder of the first index to a first specified value is equal to a second specified value according to the association relationship between the preamble transmission resource and the payload transmission resource; or determining that a ratio of the first index to a number of indexes is located within a specified value range according to the association relationship between the preamble transmission resource and the payload transmission resource; or determining that the first index belongs to a third index set according to the association relationship between the preamble transmission resource and the payload transmission resource, where the third index set is acquired according to the association relationship between the preamble transmission resource and the payload transmission resource; or determining that a payload transmission resource associated with a first preamble transmission resource is available according to the association relationship between the preamble transmission resource and the payload transmission resource, where the first preamble transmission resource is used for transmitting a sequence indicated by the first index.

The first specified value is determined according to the association between the preamble transmission resource and the payload transmission resource, or is preset, or is determined according to a code rate or an MCS used by the payload transmission.

The second specified value may be 0 or an index of the preamble transmission resource or be determined according the number or indexes of preamble transmission resources associated with one payload transmission resource.

The specified value range is determined according to the association between the preamble transmission resource and the payload transmission resource, or is preset, or is determined according to a code rate or an MCS used by the payload transmission.

Acquiring the third index set according to the association relationship between the preamble transmission resource and the payload transmission resource includes obtaining a preamble transmission resource associated with each payload transmission resource and available indexes according to the association relationship between the preamble transmission resource and the payload transmission resource, and using specified indexes in the available indexes as indexes in the third index set to obtain the third index set.

In one embodiment, the first information includes an association relationship among an index, a payload transmission resource and a DMRS. The first determination module is configured to determine that the first index satisfies the first preset rule according to the first information, including: determining that the first index belongs to one of specified indexes in indexes associated with one resource set according to the association relationship among the index, the payload transmission resource and the DMRS; or determining that the first index belongs to a fourth index set according to the association relationship among the index, the payload transmission resource and the DMRS, where the fourth index set is acquired according to the association relationship among the index, the payload transmission resource and the DMRS; or determining that the first index has an association relationship with at least one resource set according to the association relationship among the index, the payload transmission resource and the DMRS; or determining that a resource set associated with the first index is available according to the association relationship among the index, the payload transmission resource and the DMRS. The resource set consists of a specified payload transmission resource and a specified DMRS.

Acquiring the fourth index set according to the association relationship among the index, the payload transmission resource and the DMRS includes acquiring T indexes in S indexes associated with each resource set in specified resource sets according to the association relationship among the index, the payload transmission resource and the DMRS, and using the T indexes as indexes in the fourth index set to obtain the fourth index set, where the resource set consists of the specified payload transmission resource and the specified DMRS, S is an integer, T is an integer, and T is less than or equal to S.

In one embodiment, the first information includes a fifth index set, and the first determination module is configured to determine that the first index satisfies the first preset rule according to the first information, including: determining that the first index belongs to the fifth index set according to the fifth index set.

Figure 20:
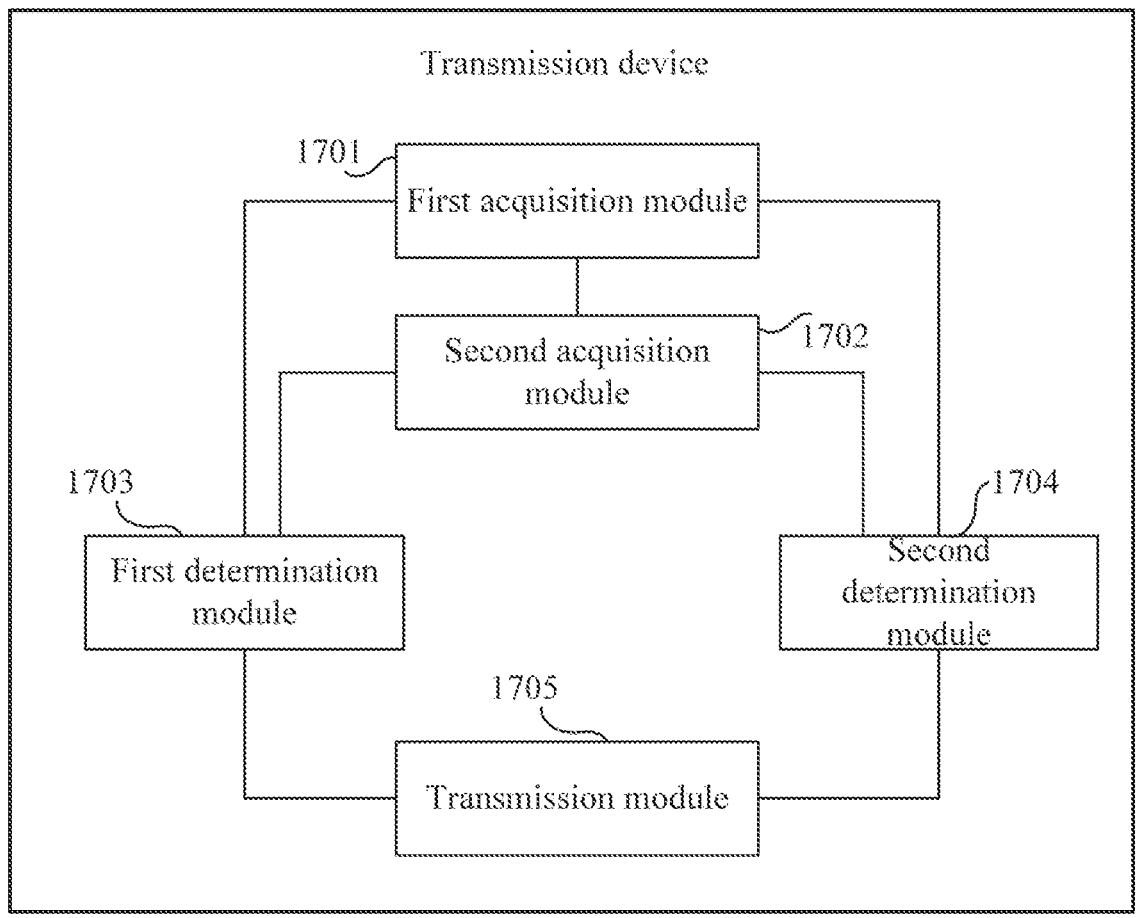
FIG. 20 is a structure diagram of a transmission device according to another embodiment of the present application.

In one embodiment, as shown in FIG. 20, the transmission device further includes a second determination module 1704, which is configured to determine, in response to determining that the first index does not satisfy the first preset rule according to the first information, that the content to be transmitted is a sequence indicated by the first index.

In one embodiment, the first message includes the sequence indicated by the first index and a payload, or a payload.

In one embodiment, the transmission device further includes a transmission module 1705, which is configured to transmit the content to be transmitted.

Figure 21:
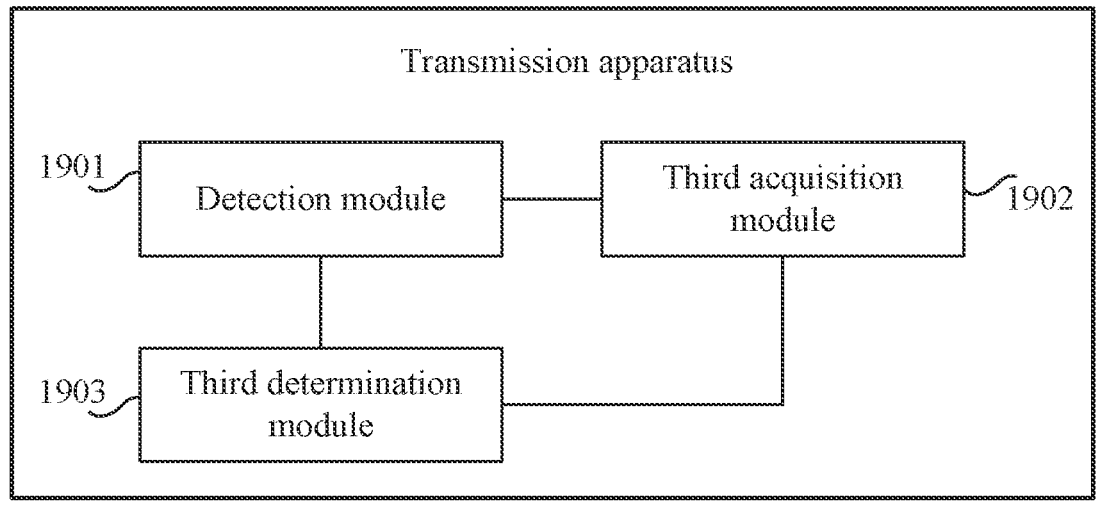
FIG. 21 is a structure diagram of a transmission device according to another embodiment of the present application.

FIG. 21 is a structure diagram of a transmission device according to an embodiment of the present application. As shown in FIG. 21, the transmission device may include a detection module 1901, a third acquisition module 1902 and a third determination module 1903. The detection module 1901 is configured to perform a sequence detection and acquire a detected sequence; the third acquisition module 1902 is configured to acquire first information, and the third determination module 1903 is configured to determine, in response to determining that the detected sequence satisfies a first preset rule according to the first information, that content to be received and detected includes a payload.

In one embodiment, the first information includes at least one of: an association relationship between an index and a DMRS, an association relationship between an index and a payload transmission resource, an association relationship between a preamble transmission resource and a payload transmission resource, an association relationship among an index, a payload transmission resource and a DMRS, or an index set.

In this embodiment of the present application, for the function of each module in each device, reference may be made to the corresponding description in the method embodiment described above, and repetition is not made here.

Figure 22:
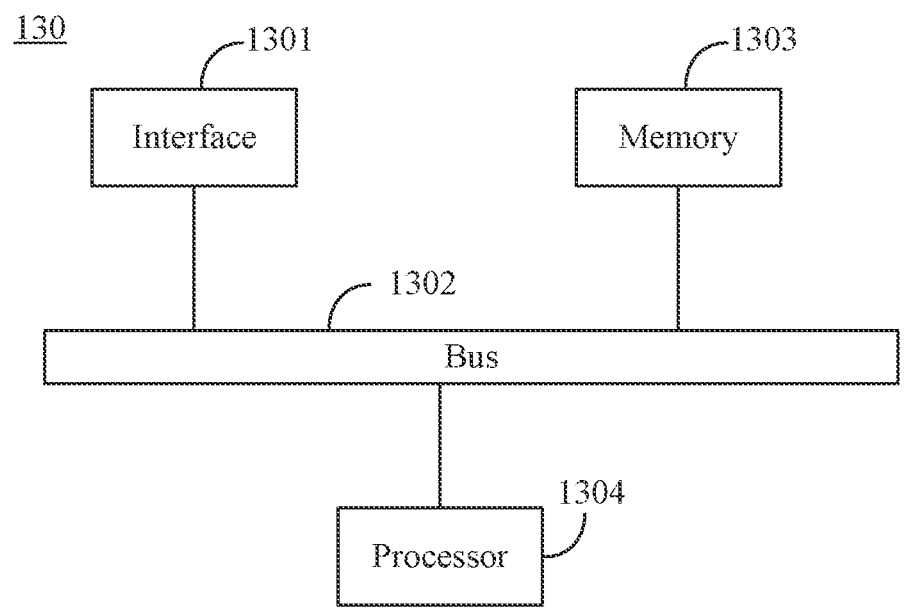
FIG. 22 is a structure diagram of a terminal according to an embodiment of the present application.

FIG. 22 is a structure diagram of a terminal according to an embodiment of the present application. As shown in FIG. 22, the terminal 130 provided by the embodiment of the present application includes a memory 1303 and a processor 1304. The terminal 130 may further include an interface 1301 and a bus 1302. The interface 1301, the memory 1303, and the processor 1304 are connected through the bus 1302. The memory 1303 is configured to store instructions. The processor 1304 is configured to read the instructions to execute the solutions of the preceding embodiments applied to the terminal. The implementation principles and technical effects are similar and are not repeated here.

Figure 23:
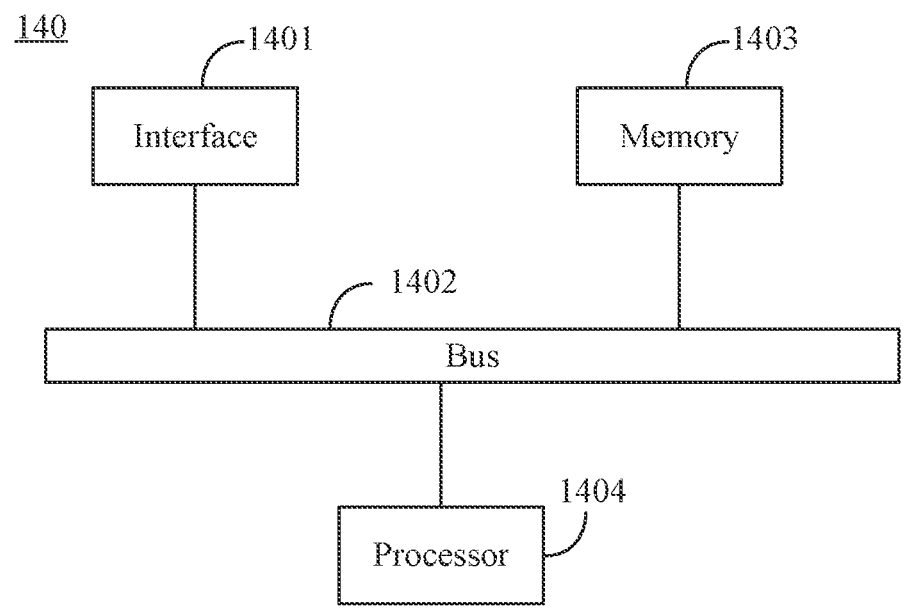
FIG. 23 is a structure diagram of a base station according to an embodiment of the present application.

FIG. 23 is a structure diagram of a base station according to an embodiment of the present application. As shown in FIG. 23, the base station 140 provided by the embodiment of the present application includes a memory 1403 and a processor 1404. The base station may further include an interface 1401 and a bus 1402. The interface 1401, the memory 1403, and the processor 1404 are connected through the bus 1402. The memory 1403 is configured to store instructions. The processor 1404 is configured to read the instructions to execute the solutions of the preceding embodiments applied to the base station. The implementation principles and technical effects are similar and are not repeated herein.

Figure 24:
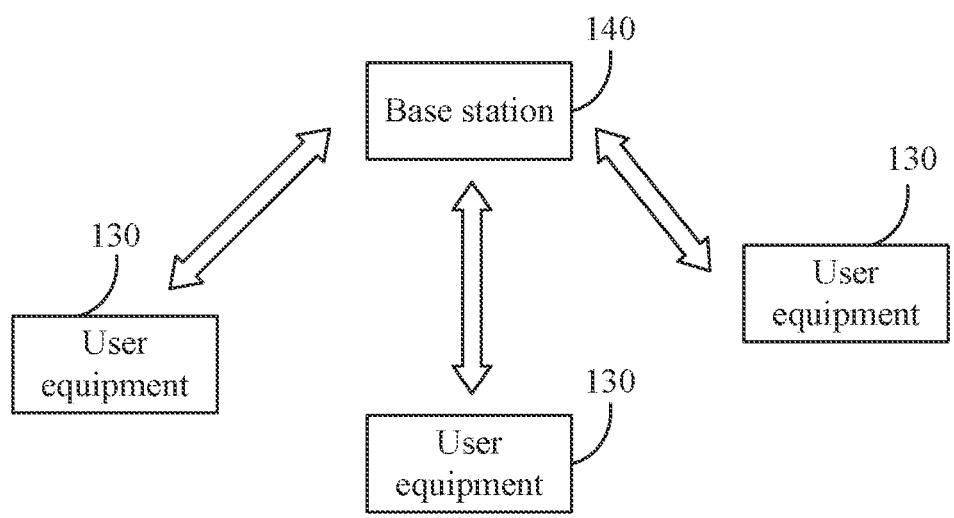
FIG. 24 is a structure diagram of a communication system according to an embodiment of the present application.

FIG. 24 is a structure diagram of a communication system according to an embodiment of the present application. As shown in FIG. 24, the system includes the terminal 130 of the above embodiments and the base station 140 of the above embodiments. The communication system of the embodiment of the present application includes, but is not to, a Long-Term Evolution (LTE) system, a LTE Frequency Division Duplex (FDD) system, a LTE Time Division Duplex (TDD) system, a Universal Mobile Telecommunication System (UMTS), or a 5th Generation (5G) system, etc.

The above are merely exemplary embodiments of the present application and are not intended to limit the scope of the present application.

In general, a plurality of embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other computing devices, although the present application is not limited thereto.

Embodiments of the present application may be implemented by a data processor of a mobile device executing computer program instructions. The implementation, for example, may be in a processor entity, by hardware, or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

A block diagram of any logic flow in drawings of the present application may represent program steps, or may represent interconnected logic circuits, modules, and functions, or may represent a combination of program steps, logic circuits, modules, and functions. The computer program may be stored in a memory. The memory may be of any type suitable for a local technical environment and may be implemented using any suitable data storage technology. The memory in embodiments of the present application may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, etc. The volatile memory may be a random-access memory (RAM), which serves as an external cache. Many forms of RAMs may be used, such as a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct rambus random-access memory (DRRAM). The memory of the system and the method described herein includes, but is not limited to, these and any other suitable types of memory.

The processor in embodiments of the present application may be of any type suitable for the local technical environment such as, but not limited to, a general-purpose computer, a special-purpose computer, a microprocessor, a digital signal processor (DSP), an application specific integrated circuit (ASIC), a field-programmable gate array (FPGA), any other programmable logic device, a discrete gate or transistor logic device, a discrete hardware component, and a processor based on a multi-core processor architecture. The general-purpose processor may be, for example, a microprocessor or any related processor. The preceding processor may implement or execute steps of the methods disclosed in embodiments of the present application. The software modules may be located at a random-access memory, a flash memory, a read-only memory, a programmable read-only memory, an electrically erasable programmable read-only memory, a register, or other established storage medium in the art. The storage medium is located in the memory. The processor reads information in the memory and implements the steps of the preceding methods in combination with hardware of the processor.

What is claimed is:

1. A transmission method, comprising:
acquiring a first index;
acquiring first information; and
in response to determining that the first index satisfies a first preset rule according to the first information, determining that content to be transmitted comprises a first message;
wherein the first message comprises a sequence indicated by the first index and a payload;
wherein the first information comprises an association relationship among an index, a payload transmission resource and a demodulation reference signal, DMRS, determining that the first index satisfies the first preset rule according to the first information comprises:
determining that the first index has an association relationship with at least one resource set according to the association relationship among the index, the payload transmission resource and the DMRS; or
determining that a resource set associated with the first index is available according to the association relationship among the index, the payload transmission resource and the DMRS; or
determining that a resource set associated with the first index is available according to the association relationship among the index, the payload transmission resource and the DMRS and determining that a transmission resource used for transmitting the sequence indicated by the first index is available;
wherein the resource set consists of a payload transmission resource and a DMRS; and
wherein the method further comprising: in response to determining that the first index does not satisfy the first preset rule according to the first information, determining that the content to be transmitted is the sequence indicated by the first index, or determining not to transmit.

2. The method of claim 1, wherein determining that the first index satisfies the first preset rule according to the first information further comprises:
determining that the first index belongs to one of specified indexes in indexes associated with one resource set according to the association relationship among the index, the payload transmission resource and the DMRS; or
determining that the first index belongs to a fourth index set according to the association relationship among the index, the payload transmission resource and the DMRS, wherein the fourth index set is acquired according to the association relationship among the index, the payload transmission resource and the DMRS.

3. The method of claim 2, wherein the fourth index set is acquired according to the association relationship among the index, the payload transmission resource and the DMRS in the following manner:
acquiring T indexes in S indexes associated with each resource set in specified resource sets according to the association relationship among the index, the payload transmission resource and the DMRS, and
using the T indexes as indexes in the fourth index set to obtain the fourth index set, wherein S is an integer, T is an integer, and T is less than or equal to S.

4. The method of claim 1, further comprising:
transmitting the content to be transmitted.

5. A non-transitory computer-readable storage medium, which is configured to store computer programs, wherein when the computer programs are executed by a processor, the transmission method of claim 1 is implemented.

6. A transmission method, comprising:
performing a sequence detection, and acquiring a detected sequence;
acquiring first information; and
in response to determining that the detected sequence satisfies a first preset rule according to the first information, determining that transmission content to be received and detected comprises a payload;
wherein the first information comprises an association relationship among an index, a payload transmission resource and a demodulation reference signal, DMRS, determining that the detected sequence satisfies the first preset rule according to the first information comprises:
determining that the detected sequence has an association relationship with at least one resource set according to the association relationship among the index, the payload transmission resource and the DMRS; or
determining that a resource set associated with the detected sequence is available according to the association relationship among the index, the payload transmission resource and the DMRS; or
determining that a resource set associated with the detected sequence is available according to the association relationship among the index, the payload transmission resource and the DMRS and determining that a transmission resource used for transmitting a sequence indicated by the detected sequence is available;
wherein the resource set consists of a payload transmission resource and a DMRS;
wherein the method further comprising: in response to determining that the detected sequence does not satisfy the first preset rule according to the first information, determining that the transmission content to be received and detected does not comprise the payload.

7. A transmission apparatus, comprising a processor and a memory for storing execution instructions that when executed by the processor cause the processor to perform the steps of the transmission method of claim 6.

8. A non-transitory computer-readable storage medium, which is configured to store computer programs, wherein when the computer programs are executed by a processor, the transmission method of claim 6 is implemented.

9. A transmission apparatus, comprising a processor and a memory for storing execution instructions that when executed by the processor cause the processor to perform steps in following modules:
a first acquisition module, which is configured to acquire a first index;
a second acquisition module, which is configured to acquire first information; and
a first determination module, which is configured to determine, in response to determining that the first index satisfies a first preset rule according to the first information, that content to be transmitted comprises a first message;
wherein the first message comprises a sequence indicated by the first index and a payload;
wherein the first information comprises an association relationship among an index, a payload transmission resource and a demodulation reference signal, DMRS, the first determination module is further configured to:
determine that the first index has an association relationship with at least one resource set according to the association relationship among the index, the payload transmission resource and the DMRS; or determine that a resource set associated with the first index is available according to the association relationship among the index, the payload transmission resource and the DMRS; or determine that a resource set associated with the first index is available according to the association relationship among the index, the payload transmission resource and the DMRS and determine that a transmission resource used for transmitting the sequence indicated by the first index is available;

wherein the resource set consists of a payload transmission resource and a DMRS; and wherein the transmission apparatus further comprises a second determination module, which is configured to determine, in response to determining that the first index does not satisfy the first preset rule according to the first information, that the content to be transmitted is the sequence indicated by the first index, or determine not to transmit.

10. The apparatus of claim 9, further comprising:

a transmission module, which is configured to transmit the content to be transmitted.

11. The apparatus of claim 9, wherein the first determination module is further configured to:

determine that the first index belongs to one of specified indexes in indexes associated with one resource set according to the association relationship among the index, the payload transmission resource and the DMRS; or determine that the first index belongs to a fourth index set according to the association relationship among the index, the payload transmission resource and the DMRS, wherein the fourth index set is acquired according to the association relationship among the index, the payload transmission resource and the DMRS.

12. The apparatus of claim 11, wherein the first determination module is configured to acquire the fourth index set according to the association relationship among the index, the payload transmission resource and the DMRS in the following manner:

acquiring T indexes in S indexes associated with each resource set in specified resource sets according to the association relationship among the index, the payload transmission resource and the DMRS, and using the T indexes as indexes in the fourth index set to obtain the fourth index set, wherein S is an integer, T is an integer, and T is less than or equal to S.

* * * * *